United States Patent [19]

Johnson et al.

[11] 4,319,324

[45] Mar. 9, 1982

[54] DOUBLE WORD FETCH SYSTEM

[75] Inventors: Robert B. Johnson, Billerica; Chester M. Nibby, Jr., Peabody; Dana W. Moore, Dover, all of Mass.

[73] Assignee: Honeywell Information Systems Inc., Waltham, Mass.

[21] Appl. No.: 110,522

[22] Filed: Jan. 8, 1980

[51] Int. Cl.[3] .............................................. G06F 13/00
[52] U.S. Cl. .................................................... 364/200
[58] Field of Search ... 364/200 MS File, 900 MS File

[56] References Cited

U.S. PATENT DOCUMENTS

| 3,440,615 | 4/1969 | Carter | 364/200 |
| 3,710,324 | 1/1973 | Cohen et al. | 364/200 |
| 3,812,473 | 5/1974 | Tucker | 364/200 |

*Primary Examiner*—Raulfe B. Zache
*Attorney, Agent, or Firm*—Faith F. Driscoll; Nicholas Prasinos

[57] ABSTRACT

A memory subsystem couples to a single word bus in common with a central processing unit for processing memory requests received therefrom. The subsystem includes at least a pair of independently addressable dynamic memory module units. Each memory unit includes a number of rows of random access memory (RAM) chips. The subsystem receives as part of each memory request an address, the least significant portion of which specifies the row of chips to be accessed within a first one of the pair of memory units. The subsystem further includes control circuits, common timing circuits and common addressing circuits. The addressing circuits which couple to both module units provide the required address signals to both modules for enabling the simultaneous access of a pair of words therefrom. The control circuits, in response to each memory request which specifies a predetermined type of memory operation, condition the timing circuits to generate a sequence of timing signals for access and read out of the pair of words into a pair of tri-state operated data registers. The outputs of the data registers are connected in common and under the control of the timing circuits, the words are multiplexed onto the single word bus for transfer to the central processing unit over a corresponding number of successive bus cycles.

30 Claims, 11 Drawing Figures

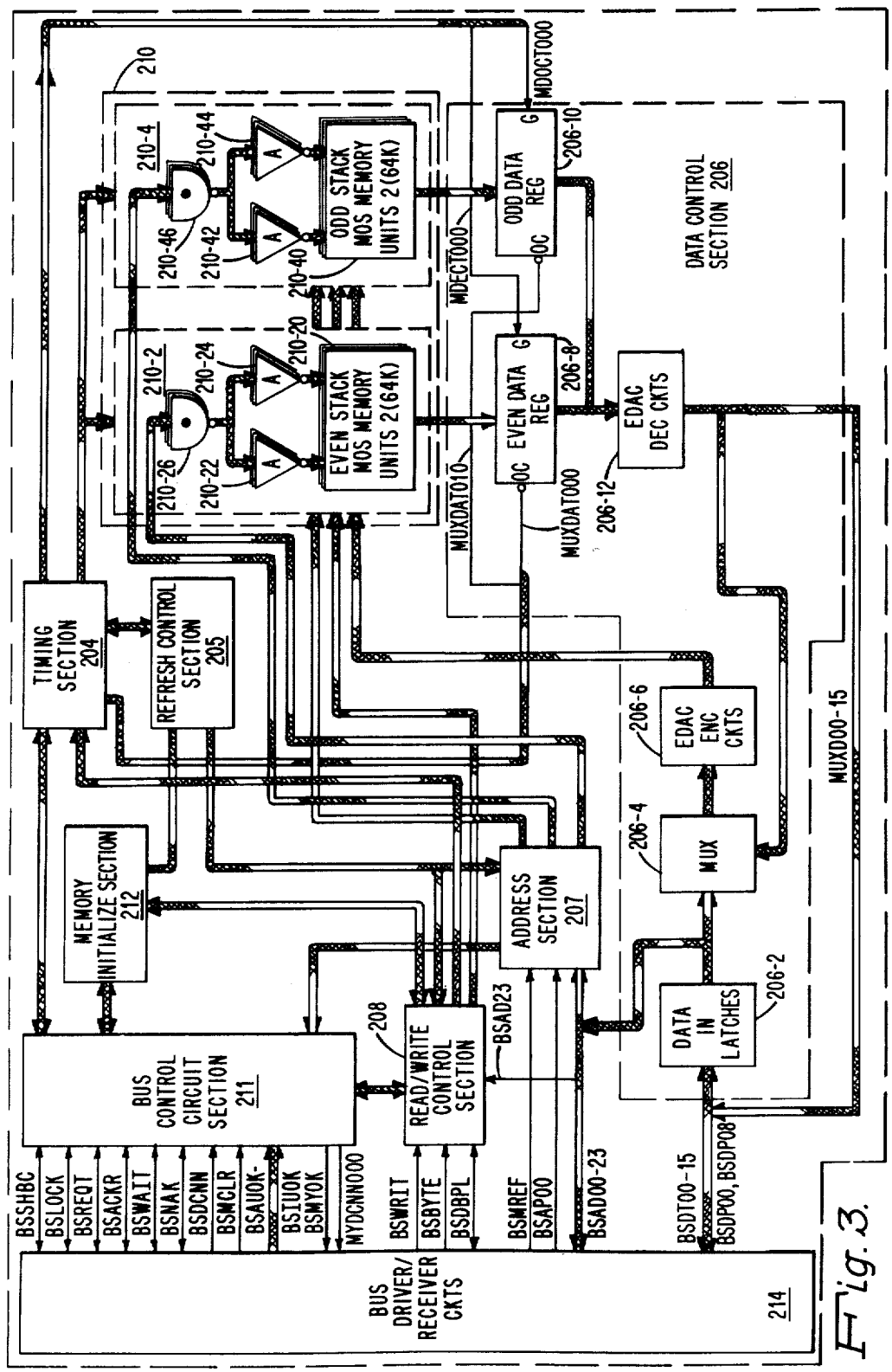

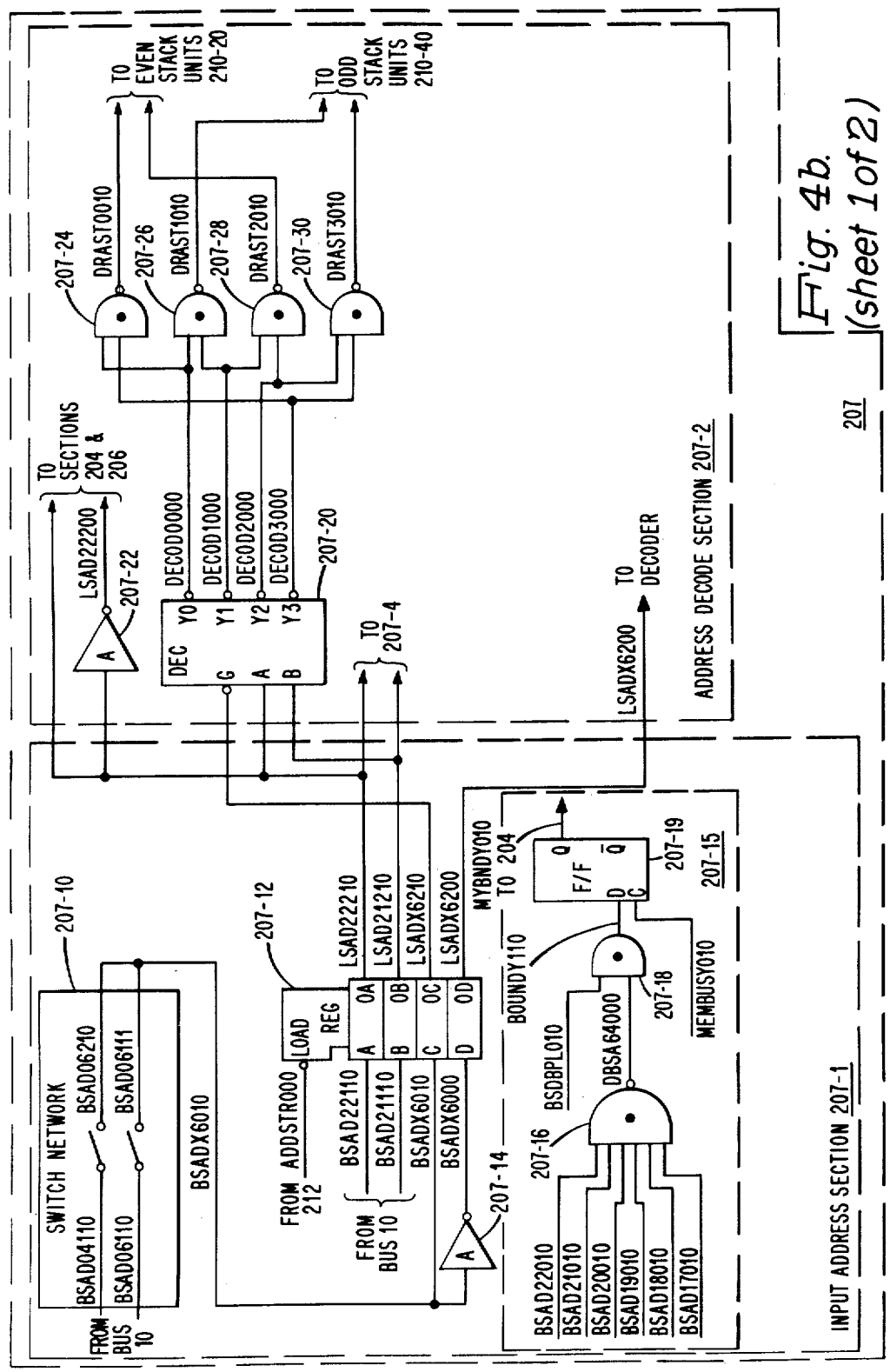
Fig. 4b. (sheet 1 of 2)

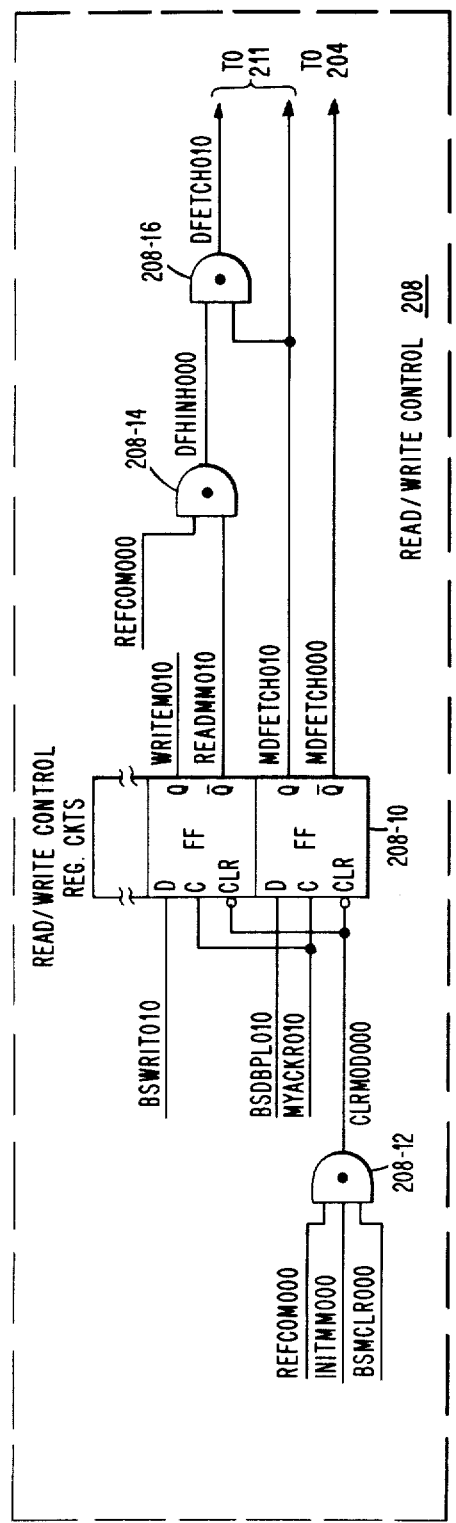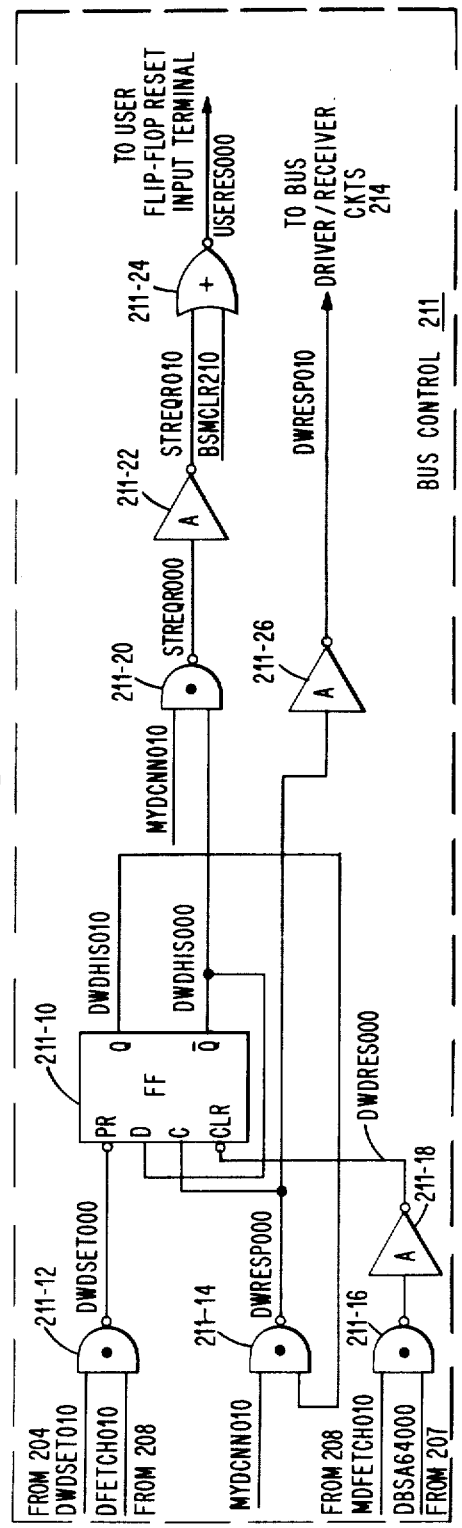
Fig. 4c.
Fig. 4d.

DOUBLE WORD FETCH SYSTEM

RELATED APPLICATIONS

1. "Sequential Chip Select Decode Apparatus and Method" invented by Robert B. Johnson, Chester M. Nibby, Jr. and Dana W. Moore, Ser. No. 110,523, filed on Jan. 8, 1980 and assigned to the same assignee as named herein.

2. "Sequential Word Aligned Address Apparatus" invented by Robert B. Johnson, Chester M. Nibby, Jr. and Dana W. Moore, Ser. No. 110,521, filed on Jan. 8, 1980 and assigned the the same assignee as named herein.

3. "Multimode Memory System" invented by Robert B. Johnson and Chester M. Nibby, Jr., Ser. No. 110,520, filed on Jan. 8, 1980 and assigned to the same assignee as named herein.

BACKGROUND OF THE INVENTION

1. Field of Use

This invention relates to memory systems containing semiconductor memory elements including those in which stored information must be periodically refreshed to preserve the integrity of such information.

2. Prior Art

It is well known to construct memory systems from a number of memory modules. In certain prior art systems, memory modules are paired together to provide a double word fetch access capability. The term double word fetch access as used herein refers to the capability of being able to access a pair of words at a time from a memory system during a cycle of operation. This type of system is described in the copending patent application "System Providing Multiple Fetch Bus Cycle Operation", invented by John L. Curley, Robert B. Johnson, Richard A. Lemay and Chester M. Nibby, Jr., Ser. No. 867,270, filed on Jan. 5, 1978, now U.S. Pat. No. 4,236,203, issued Nov. 25, 1980 and assigned to the same assignee as named herein.

In the above prior art system, the memory system connects to an asynchronously operated single word wide bus. In the arrangement, a request for multiple words is made in a single bus cycle and the requested information words are delivered to the bus over a cycle of operation which consists of a series of response cycles.

It will be noted that in such double word fetch memory module systems, it is necessary to generate and decode even and odd addresses for accessing both memory modules. Such an arrangement for accomplishing the required address generation/decoding is described in copending patent application "A Dynamic Memory System which Includes Apparatus for Performing Refresh Operations in Parallel with Normal Memory Operations", invented by Robert B. Johnson and Chester M. Nibby, Jr., Ser. No. 926,480, filed on July 20, 1978, now U.S. Pat. No. 4,185,323, issued Jan. 22, 1980 and assigned to the same assignee as named herein.

In the above arrangement, the low order bits of the address provided with the memory request specify the storage location being accessed while the high order bits specify which row of RAM chips is being selected.

The address arrangement includes a primary address register which also served as a counter and two parallel secondary address registers. In carrying out a double fetch operation, the initial address was loaded into the primary address register and then stored in the appropriate secondary address register. Then, the memory subsystem, after signaling it was busy, incremented the initial address contents of the primary address register by one and the resulting address was then stored in the other secondary address register.

Because of the additional time required to generate the second address, the memory timing circuits included circuits for generating two sets of clocking signals and for steering the sets of clocking signals to the appropriate memory module units. This was necessary to enable the read out of the pair of words into the subsystem data output registers in time for transfer to the bus.

It was found that the above arrangement was exceedingly complex and costly.

Accordingly, it is a primary object of the present invention to provide a low cost memory subsystem which incorporates a double fetch capability.

It is a further object of the present invention to provide a double fetch memory subsystem which can be implemented with a minimum of circuits.

SUMMARY OF THE INVENTION

The above and other objects are achieved in a preferred embodiment of the preferred embodiment of the memory subsystem of the present invention which couples to a single word bus in common with a central processing unit and processes memory requests received therefrom. The subsystem includes at least a pair of independently addressable memory module units which operatively couple to a single word bus. Each memory module unit includes a number of rows of random access memory (RAM) chips.

According to the present invention, the address associated with each memory request received by the memory subsystem is coded so that the least significant or low order memory address bits specify which row of RAM chips contains the first word to be accessed. The remaining more significant or higher order memory address bits specify the storage location within one of the module units containing the word to be accessed.

The memory subsystem further includes common timing circuits, common addressing circuits and common control circuits. The addressing circuits which couple to both module units provide the required address signals to both modules within a minimum of time for enabling simultaneous access of a pair of words therefrom.

Control circuits, in response to each memory request which specifies a double fetch type of memory operation, condition the timing circuits to generate a single sequence of timing signals for access and simultaneous read out of the pair of words into the tristate operated data register associated with each module unit.

In accordance with the present invention, the tristate data registers which couple to the timing circuits have their output terminals connected in common to the single bus. Under the control of the timing circuits, the data registers are conditioned to multiplex the pair of words onto the bus for transfer to the central processing unit over a corresponding number of successive bus cycles of operation.

The subsystem of the present invention utilizes or incorporates the Sequential Chip Select Decode Apparatus and the Sequential Word Aligned Address Apparatus which are described in detail in the referenced related patent applications. This reduces considerably the complexity of the addressing and decode circuits. The result is that the double fetch memory subsystem of the present invention can be constructed at low cost and with a minimum of circuit complexity. This facilitates maintenance and increases reliability.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIG. 3 shows in block diagram form, the memory subsystem 20 of FIG. 1.

FIGS. 4a through 4e illustrate in greater detail different portions of the memory subsystem 20 of FIG. 3.

GENERAL DESCRIPTION OF SYSTEM OF FIG. 1

Figure 1:
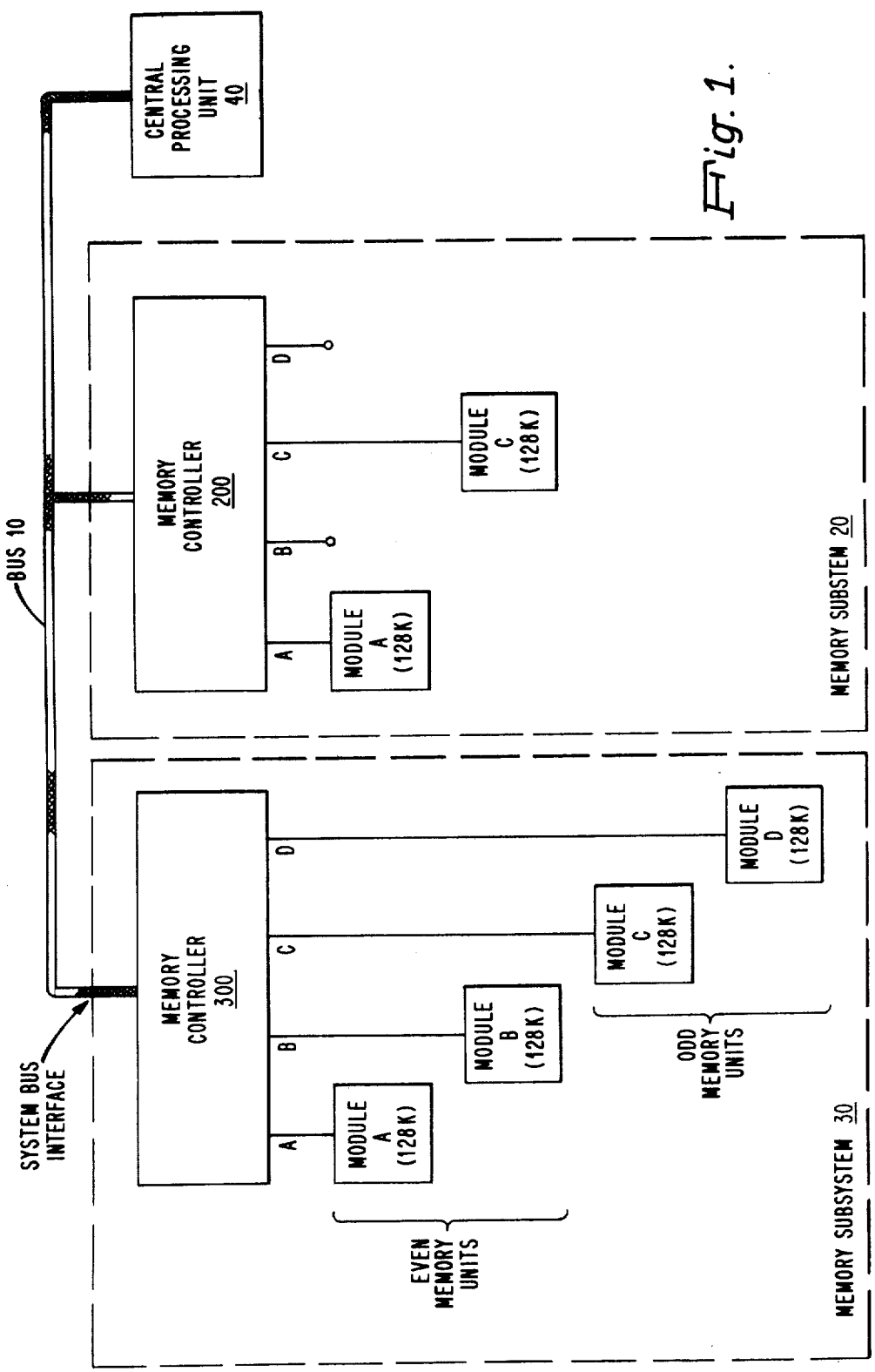
FIG. 1 shows in block diagram form a system which incorporates the principles of the present invention.

FIG. 1 illustrates a data processing system which includes the apparatus of the present invention. Referring to the figure, it is seen that the system includes a multiline bus 10 coupled to a plurality of memory subsystems 20 and 30 and to a central processing unit (CPU) 40. It will be appreciated that the system of FIG. 1 will normally include other units such as those disclosed in U.S. Pat. No. 4,000,485, issued Dec. 28, 1976. The memory subsystems 20 and 30 each include a memory controller which can address up to four memory module units. In FIG. 1, memory controller 200 is connected to address module units labeled A and C while memory controller 300 is connected to address the module units labeled A through D.

The CPU 40 is operated under control of a microprogrammable control unit which includes a control store, an output register and decode and control circuits, not shown. Different groups of words of the control store correspond to groups of microinstructions coded for executing program instructions. Each microinstruction word has a format such as that disclosed in U.S. Pat. No. 4,130,879, issued Dec. 19, 1978 to David A. Cushing titled "Apparatus for Performing Floating Point Arithmetic Operations Using Submultiple Storate".

The particular word format includes a bus control field. These bits are coded to generate signals for specifying the particular type of operation required for the execution of the different program instructions being processed by CPU 40. Additionally, as explained herein, the bits generate signals for applying the appropriate address to bus 10. For example, those program instructions specifying operations including fetching instructions or procedure words from memory each cause the accessing and read out of a microinstruction word from the control store in which the bus control field bits are coded to specify a single word fetch memory read operation. Other program instructions such as those specifying the fetching of operands or data from memory each cause the read out of a microinstruction word from the control store in which the bus control field bits are coded to specify a double word fetch memory read opertion.

CPU 40 has a number of registers which includes a program counter register for normally storing the address of the program instruction currently being executed by CPU 40 and a Y register for normally storing the address of an operand. Both these registers are connected to different sets of input terminals of a multiplexer circuit, the output of which is applied to the address lines of bus 10. For further information regarding CPU 40, reference may be made to the copending patent application "A Dynamic Memory System which Includes Apparatus for Performing Refresh Operations in Parallel with Normal Memory Operations".

The CPU 40 and memory subsystems 20 and 30 communicate over the bus 10 in a predetermined manner as set forth in U.S. Pat. No. 4,000,485. Briefly, a unit wishing to communicate requests a bus cycle and when the bus cycle is granted, the unit becomes the "master" and is able to address any other unit in the system as the "slave". In cases of those bus exchanges which require a response (e.g. memory read operation), the requesting unit as "master" identifies itself and indicates to the "slave" unit that a response is required. When the slave is ready to respond (e.g. obtains the information requested), it assumes the role of "master" and initiates the transfer of information to the requesting unit. Thus, the number of bus cycles vary depending upon the type of operation being performed. By altering the states of the signals applied to the control lines discussed in connection with FIG. 2, a unit is able to designate to the other unit, the type of cycle or operation being initiated or performed.

MEMORY SUBSYSTEM INTERFACE

Figure 2:
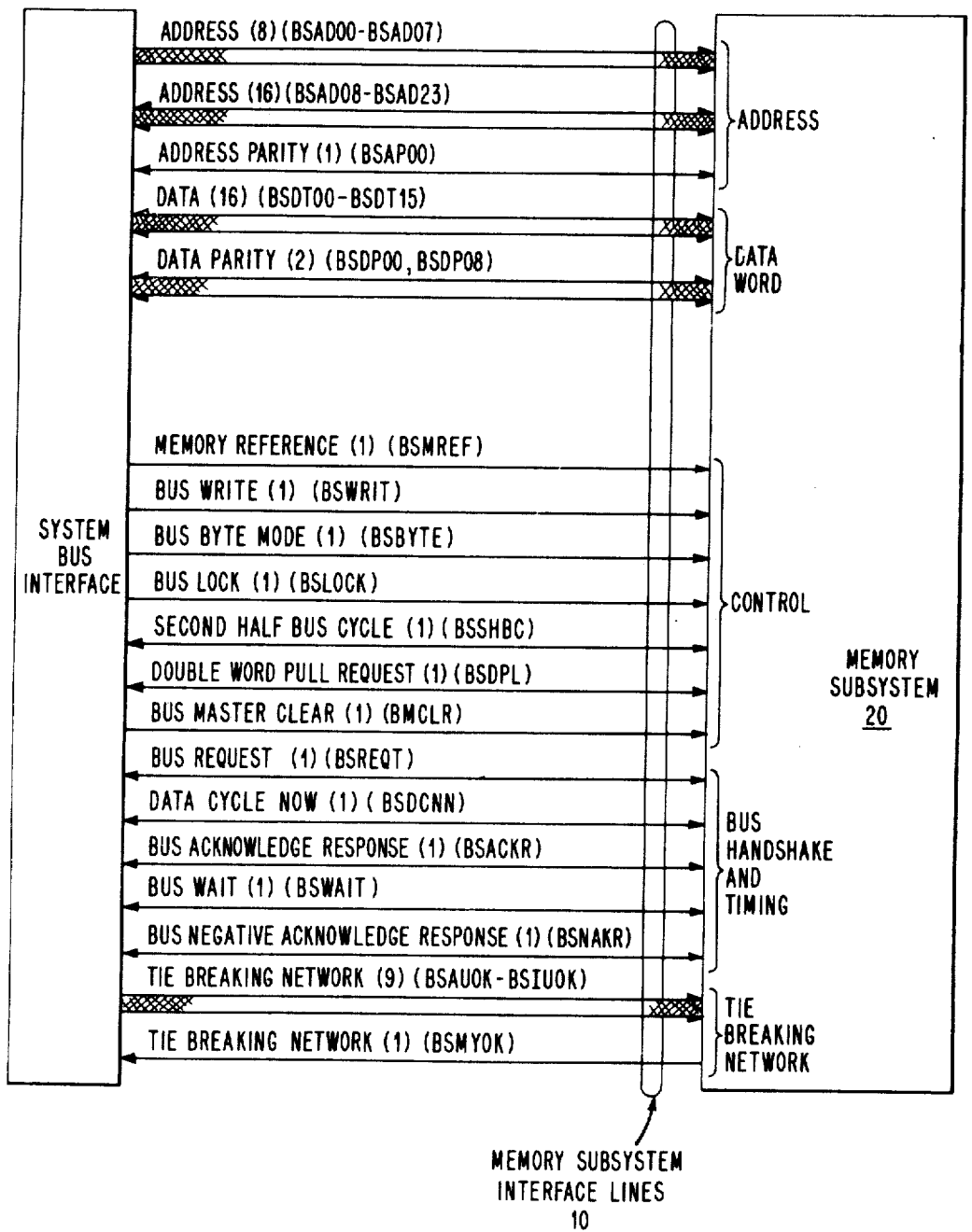
FIG. 2 shows in detail the lines of the system bus 10 which connect to the memory subsystem of FIG. 1.

FIG. 2 shows the lines which constitute the interface between each memory subsystem and bus 10. As shown, bus 10 includes a number of address lines (BSAD00-23, BSAP00), one set of data lines (BSDT0-15, BSDP00, BSDP08), a number of control lines (BSMREF-BSMCLR), a number of timing lines (BSREQT-BSNAKR) and a number of tie breaking network lines (BSAUOK-BSIUOK, BSMYOK).

The description of the above interface lines are given in greater detail in the section to follow.

| MEMORY SUBSYSTEM INTERFACE LINES | |
|---|---|
| Designation | Description |
| | Address Lines |
| BSAD00–BSAD23 | The bus address lines constitute a twenty-four bit wide path used in conjunction with the bus memory reference line BSMREF to transfer a 24-bit address to subsystem 20 or a 16-bit identifier from subsystem 20 to bus 10 (for receipt by a slave unit). When used for memory addressing, the signals applied to lines BSAD00-BSAD03 select a particular 512K word module, the signals applied to lines BSAD04-BSAD22 select one of the 512K words in the module while the |

MEMORY SUBSYSTEM INTERFACE LINES

| Designation | Description |
|---|---|
| | signal applied to line BSAD23 selects one of the bytes within the selected word (i.e., BSAD23 = 1 = right byte; BSAD23 = 0 = left byte). When used for identification, lines BSAD00-BSAD07 are not used. The lines BSAD08-BSAD23 carry the identification of the receiving unit as transmitted to subsystem 20 during the previous memory read request. |
| BSAP00 | The bus address parity line is a bidirectional line which provides an odd parity signal for the address signals applied to lines BSAD00-BSAD07. |
| | Data Lines |
| BSDT00-BSDT15 | The set of bus data lines constitute a 16-bit or one word wide bidirectional path for transferring data or identification information between subsystem 20 and bus 10 as a function of the cycle of operation being performed. During a write cycle of operation, the bus data lines transfer information to be written into memory at the location specified by the address signals applied to lines BSAD00-BSAD23. During the first half of a read cycle of operation, the data lines transfer identification information (channel number) to the subsystem 20. During the second half of the read cycle, the data lines transfer the information read from memory. |
| BSDP00, BSDP08, | The bus data parity lines are two sets of bidirectional lines which provide odd parity signals coded as follows: BSDP00 = odd parity for signals applied to lines BSDT00-BSDT07 (left byte); and, BSDP08 = odd parity for signals applied to lines BSDI08-BSDT15 (right byte); |
| | Control Lines |
| BSMREF | The bus memory reference line extends from bus 10 to the memory subsystem 20. When set to a true state, this line signals the subsystem 20 that the lines BSAD00-BSAD23 contain a complete memory controller address and that it is performing a write or read operation upon the specified location. When reset to a false state, the line signals subsystem 20 that the lines BSAD00-BSAD23 contain information directed to another unit and not subsystem 20. |
| BSWRIT | The bus write line extends from the bus 10 to the memory subsystem 20. This line when set to a true state, in conjunction with line BSMREF being true, signals subsystem 20 to perform a write cycle of operation. When reset to a false state, this line, in conjunction with line BSMREF being true, signals subsystem 20 to perform a read cycle of operation. |
| BSBYTE | The bus byte line extends from bus 10 to subsystem 20. This line, when set to a true state, signals subsystem 20 that it is |
| | to perform a byte operation rather than a word operation. |
| BSLOCK | The bus lock line extends from bus 10 to subsystem 20. When set to a true state, this line signals subsystem 20 of a request from central processor 40 to test or change the status of a memory lock flip-flop included within the controller 200. |
| BSSHBC | The bus second half bus cycle line is used to signal a unit that the current information applied to bus 10 by subsystem 20 is the information requested by a previous read request. In this case, both subsystem 20 and the unit receiving the information are busy to all units from the start of the initiation cycle until subsystem 20 completes the transfer. This line is used in conjunction with the BSLOCK line to set or reset its memory lock flip-flop. When a unit is requesting to read or write and line BSLOCK is true, the line BSSHBC, when true, signals subsystem 20 to reset its lock flip-flop. When in a false state, it signals subsystem 20 to test and set its lock flip-flop. |
| BSDBPL | The double word pull line is a bidirectional line which extends between bus 10 and subsystem 20. This line, when set to a true state, signals subsystem 20 that a double word operation is requested. Additionally, the subsystem 20 forces the line to a true state during the data cycle (BSDCNN = 1) to signal the receiving unit that a second word is to follow. When the second word falls on an address boundary condition, the line is not forced to a true state and only a single word is transferred. |
| BSMCLR | The bus master clear line extends from bus 10 to subsystem 20. When this line is set to a true state, it causes the subsystem 20 to clear to zeros certain bus circuits within controller 200. |
| | Bus Handshake/Timing Lines |
| BSREQT | The bus request line is a bidirectional line which extends between bus 10 and subsystem 20. When set to a true state, it signals the subsystem 20 that another unit is requesting a bus cycle. When reset to a false state, it signals subsystem 20 that there is no bus pending bus request. This line is forced to a true state by subsystem 20 to request a read second half bus cycle. |
| BSDCNN | The data cycle line is a bidirectional line which extends between bus 10 and subsystem 20. When forced to a true state, the line signals the subsystem 20 that a unit was granted a requested bus cycle and placed information on the bus for another unit. The subsystem 20 forces the line to a true state to signal that it is transmitting requested data back to a unit. Prior to this, subsystem 20 had requested and |

| MEMORY SUBSYSTEM INTERFACE LINES | |
|---|---|
| Designation | Description |
| BSACKR | been granted a bus cycle. The bus acknowledge line is a bidirectional line which extends between the bus 10 and subsystem 20. When set to a binary ONE by subsystem 20, the line signals that it is accepting a bus transfer during a read first half bus cycle or write cycle. During a read second half bus cycle, this line when set to a binary ONE by the unit which originated the request signals the subsystem 20 of its acceptance of a transfer. |
| BSWAIT | The bus wait line is a bidirectional line which extends between bus 10 and subsystem 20. When set to a true or binary ONE state by subsystem 20, it signals a requesting unit that the subsystem cannot accept a transfer at this time. Thereafter, the unit will initiate successive retries until the subsystem 20 acknowledges the transfer. The subsystem 20 sets the BSWAIT line true under the following conditions:<br>1. It is busy performing an internal read or write cycle of operation.<br>2. It is requesting a read second half bus cycle.<br>3. It is anticipating a refresh operation.<br>4. It is performing a refresh operation.<br>5. It is busy when placed in an initialize mode.<br>When the BSWAIT line is set to a true or binary ONE state by a unit, this signals the subsystem 20 that the data is not being accepted by the requesting unit and to terminate its present bus cycle of operation. |
| BSNAKR | The bus negative acknowlege line is a bidirectional line which extends between the bus 10 and subsystem 20. When this line is set to a true or binary ONE state by subsystem 20, it signals that it is refusing a specified transfer. The subsystem 20 sets line BSNAKR to a true state as follows:<br>1. Memory lock flip-flop is set to a binary ONE, and<br>2. The request is to test and set the lock flip-flop (BSLOCK true and BSSHBC false).<br>In all other cases, when the memory lock flip-flop is set, subsystem 20 generates a response via the BSACKR line or the BSWAIT line or generates no response.<br>When the BSNAKR line is forced true by a unit, this signals subsystem 20 that the data is not accepted by the unit and to terminate its cycle of operation.<br>Tie Breaking Control Lines |
| BSAVOK-BSIUOK | The tie breaking network lines extend from bus 10 to subsystem 20. These lines signal subsystem 20 whether units of higher priority have made bus requests. When all the signals on these lines are binary ONES, this signals subsystem 20 that it has been granted a bus cycle at which time it is able to |

| MEMORY SUBSYSTEM INTERFACE LINES | |
|---|---|
| Designation | Description |
| | force the BSDCNN line to a binary ONE. When any one of the signals on the lines is a binary ZERO, this signals subsystem 20 that it has not been granted a bus cycle and is inhibited from forcing line BSDCNN to a binary ONE. |
| BSMYOK | The tie breaking network line extends from subsystem 20 to bus 10. Subsystem 20 forces this line to a false or binary ZERO state to signal other units of lower priority of a bus request. |

Memory Subsystem 20

FIG. 3 shows a preferred embodiment of a memory subsystem which is constructed using the principles of the present invention. Referring to FIG. 3, it is seen that subsystem 20 includes a memory controller 200 which controls the two 128K word memory module units 210-2 and 210-4 of memory section 210. The module units of blocks 210-2 and 210-4 include high speed MOS random access memory integrated circuits designated by blocks 210-20 and 210-40, and address buffer circuits designated by blocks 210-22 through 210-46. Each 128K memory unit is constructed from 64K word by one bit dynamic MOS RAM chips illustrated in greater detail in FIG. 4e. More specifically, referring to FIG. 4e, it is seen that each 128K by 22 bit memory module includes forty-four 65,534 (64K) word by one bit chips. Within each chip there are a number of storage arrays organized in a matrix of 256 rows by 256 columns of storage cells.

The controller 200 includes those circuits required to generate memory timing signals, perform refresh operations, data transfer operations, address distribution and decoding operations and bus interface operations. Such circuits are included as part of the different sections of FIG. 3.

The sections include a timing section 204, a refresh control section 205, a data control section 206, an address section 207, a read/write control section 208, a bus control circuit section 211 and memory initialize circuit section 212 and a bus driver/receiver circuit section 214.

The bus control section 211 includes the logic circuits which generate signals for generating and accepting bus cycle requests for single and double word fetch operations. As seen from FIG. 3, these circuits as well as the circuits of other sections are connected to bus 10 via driver/receive circuits of section 214, conventional in design. It will be noted that the binary ONE and ZERO states of the signals on bus 10 and those utilized within subsystem 20 differ. The bus signals operate with negative logic while the subsystem 20 utilizes positive logic. The section 211 includes the tie breaking network circuits which resolve request priority on the basis of a unit's physical position on the bus. The memory subsystem 20, located at the left most or bottom position, is assigned the highest priority while the CPU 40, located at the highest most or top position, is assigned the lowest priority. For further information regarding bus operation, reference may be made to the above mentioned U.S. patents and U.S. patent applications.

Figure 4A:
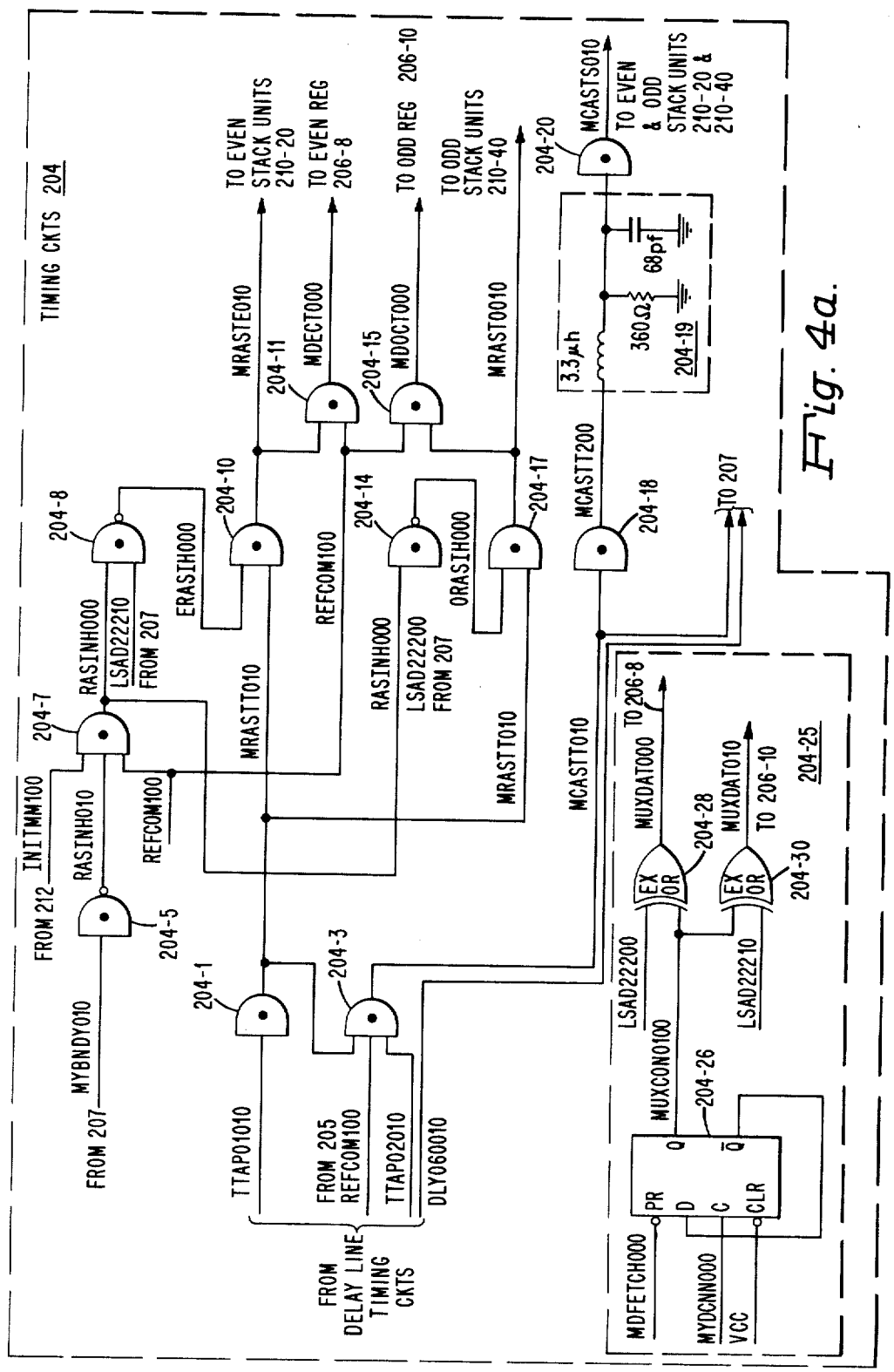
Figure 4B:
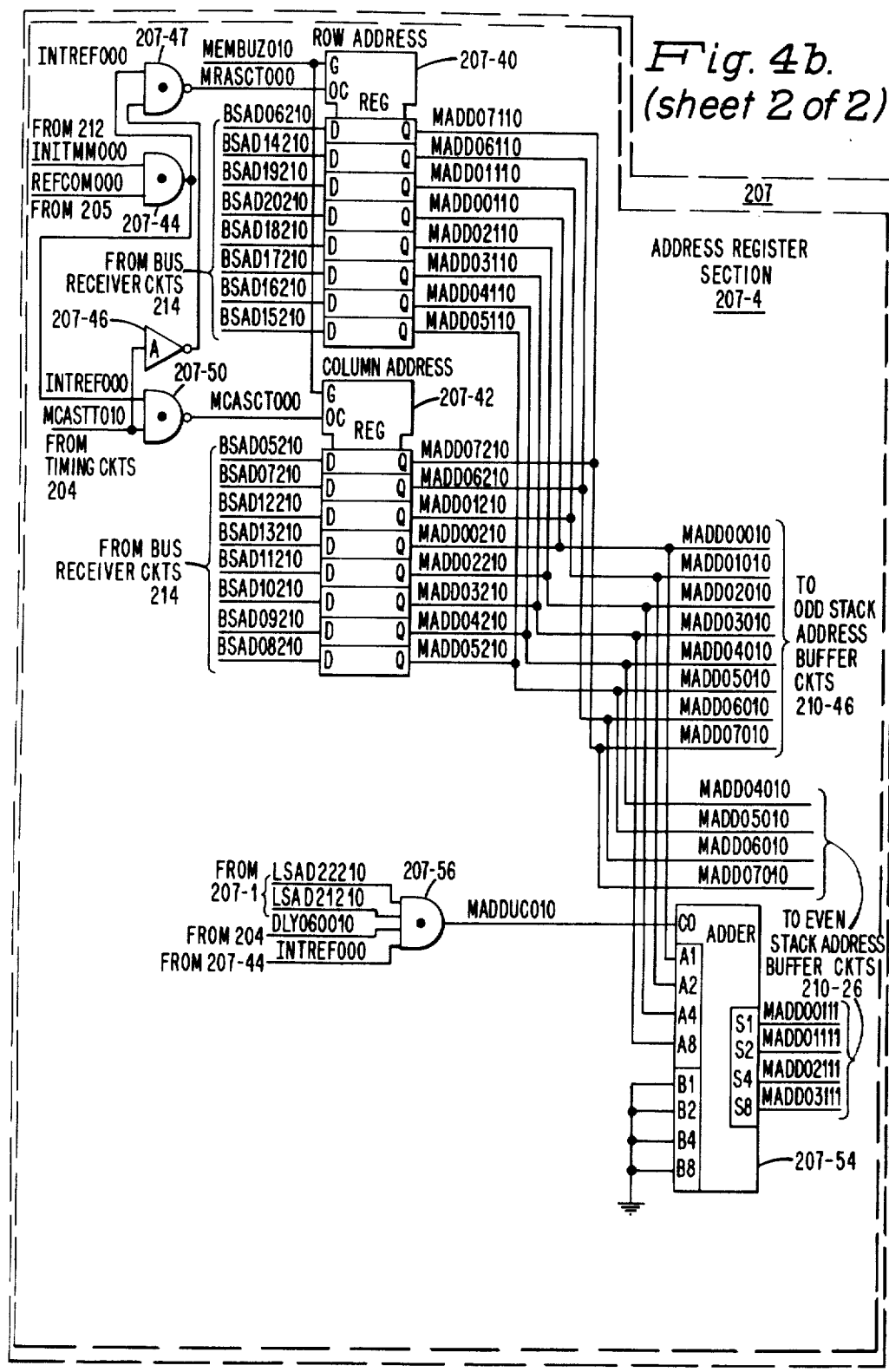

The timing section 204, shown in detail in FIG. 4b, includes circuits which generate the required sequence of timing signals for memory read and write cycles of operation. As seen from FIG. 3, this section transmits and receives signals to and from sections 205, 206, 207, 208 and 211.

In accordance with the present invention, the address section 207, shown in greater detail in FIG. 4b, includes circuits which decode, generate and distribute address signals required for initialization and read/write selection. The section 207 receives address signals from lines BSAD08-BSAD23 and address lines BSAD00-BSAD07 and BSAP00 in addition to the memory reference control signal from the BSMREF line. Additionally, section 207 receives control and timing signals from sections 204 and 212.

The memory initialize section 212 includes circuits, conventional in design, for clearing the memory subsystem circuits to an initial or predetermined state.

The read/write control section 208 includes register and control logic circuits, conventional in design. The register circuits receive and store signals corresponding to the states of the BSWRIT, BSBYTE and BSDBPL control lines and the address line BSAD23. The control circuits decode the signals from register circuits and generate signals applied to sections 204, 207 and 210 for establishing whether the subsystem is to perform a read, write or a read followed by a write cycle of operation (i.e., for a byte command).

The refresh section 205 includes the circuits for periodically refreshing the contents of memory. Section 205 receives timing and control signals from section 204 and provides control signals to sections 204, 207, 208 and 212.

The data control section 206 includes data-in registers 206-2, a pair of tristate operated data registers 206-8 and 206-10 and multiplexer circuits 206-4 with associated control circuits which enable data to be written into and/or read from the even and odd memory units 210-20 and 210-40 of section 210. For example, during a double word fetch read cycle of operation, operand or instruction signals are read out from the units 210-20 and 210-40 into the even and odd output registers 206-8 and 206-10. During a write cycle of operation, the byte operand signals are loaded into the pair of registers of block 206-2 from bus 10 and written into the odd or even unit of section 210.

The subsystem 20 includes an error detection and correction option (EDAC) wherein each word contains 16 data bits and 6 check bits used to detect and correct single bit errors in the data words and detect and signal without correction, double bit errors in the data word.

The EDAC option includes the EDAC encoder circuits 206-6 and EDAC decoder circuits 206-12. These circuits may take the form of those circuits disclosed in U.S. Pat. No. 4,072,853 which issued Feb. 7, 1978.

Additionally, the section 206 enables the return of identification information received from the data lines BSDT00-15 and stored in register 206-2 via the address lines BSAD08-23.

Pertinent portions of the above sections will now be discussed in greater detail with reference to FIGS. 4a through 4e.

DETAILED DESCRIPTION OF CONTROLLER SECTIONS

Only those sections which are believed necessary to an understanding of the present invention are described herein. For further information regarding the remaining sections, reference may be made to the related patent applications or to copending patent application "A Dynamic Memory System which Includes Apparatus for Performing Refresh Operations in Parallel with Normal Memory Operations".

Section 204

FIG. 4a illustrates in greater detail, the timing circuits of section 204. The circuits receive input timing pulse signals TTAP01010 and TTAP02010 from delay line timing generator circuits, not shown, conventional in design. The timing generator circuits generate a series of timing pulses via a pair of series connected 200 nanosecond delay lines in response to the signal MYACKR010 being switched to a binary ONE. These pulses in conjunction with the circuits of block 204 establish the timing for the remaining sections during a memory cycle of operation.

Additionally, the circuits of block 204 receive a boundary signal MYBNDY010, address signals LSAD22200 and LSAD22210 from section 207. Also, section 212 applies an initialize signal INITMM100 to section 204. The signal MYBNDY010 is applied to a NAND gate 204-5 which forces signal RASINH010 to a binary ZERO. The series connected AND gate 204-7 logically combines initialize signal INITMM100, refresh command signal REFCOM100 generated by circuits within section 204, not shown, to produce signal RASINH000. A NAND gate 204-8 combines signals RASINH000 and address signal LSAD22210 to produce an even row strobe inhibit signal ERASIH000. The signal is applied to an AND gate 204-10 for combining with a timing signal MRASTT-010 derived from signal TTAP01010 via an AND gate 204-1. The result output signal MRASTE010 is applied to the RAS timing input of the even stack units 210-20.

A NAND gate 204-14 combines signal RASINH000 and LSAD222000 to produce an odd row inhibit signal ORASIH000. This signal is combined in an AND gate 204-17 with timing signal MRASTT010 to generate row timing signal MRAST0010. This signal is applied to the RAS timing input of the odd stack units 210-40.

As seen from FIG. 4a, an AND gate 204-11 applies a timing signal MDECT000 to the even data register 206-8 in the absence of a refresh command (i.e., signal REFCOM100=0). Similarly, an AND gate 204-15 applies a timing signal MDOCT000 to the odd data register 206-10. The delay network 204-19 which connects in series with AND gates 204-3, 204-18 and 204-20 generate timing signal MCASTS010. The signal MCASTS010 is applied to the CAS timing input of the even and odd stack units 210-20 and 210-40.

Additionally, section 204 incluces the logic and storage circuits of block 204-25. These circuits generate the signals which control the operation of the tristate even and odd data registers 206-8 nd 206-10 as explained herein. As shown, the circuits include a D type flip-flop 204-26 and a pair of exclusive OR gates 204-28 and 204-30 connected as shown.

The flip-flop 204-26 is held in a binary ONE state except in the case of a double fetch operation when signal MDFETCH000 is a binary ZERO. This enables flip-flop 204-26 to reset to a binary ZERO when signal MYDCNN000 switches from a binary ONE to a binary ZERO. The switching of the state of signal MUXCON0100 causes a change in the states of signals MUXDAT000 and MUXDAT010. For example, when the least significant bit 22 is a binary ZERO, gate 204-30 switches signal MUXDAT010 to a binary ONE when signal MUXCON0100 is a binary ONE. However, gate 204-28 holds signal MUXDAT000 in a binary ZERO state. When signal MUXCON0100 switches to a binary ZERO, gate 204-30 switches signal MUXDAT010 to a binary ZERO. At the same time gate 204-28 switches signal MUXDAT000 to a binary ONE.

The signals MUXDAT000 and MUXDAT010 are applied to the OC terminals of the even and odd data registers 206-8 and 206-10. As mentioned above, these registers are tristate operated. More specifically, the registers are constructed from D type transparent latch circuits such as those designated as SN74S373 manufactured by Texas Instruments Incorporated.

The register circuits are transparent meaning that while a G input terminal is a binary ONE, the signals at the Q output terminals follow the signals applied to the D input terminals. The G input terminal of even data register 206-8 is connected to receive timing signal MDECT000. The G input terminal of odd data register 206-10 is connected to receive timing signal MDOCT000.

The output terminals of registers 206-8 and 206-10 are connected in common in a wired OR arrangement for enabling the multiplexing of the pair of data word signals. Such multiplexing is accomplished by controlling the states of the signals applied to the output control (OC) input terminals of registers 206-8 and 206-10.

More specifically, when each of the signals MUXDAT000 and MUXDAT010 is in a binary ONE state, this inhibits any data word signals form being applied at the Q output terminals of the register associated therewith. However, this operation is independent of the latching action of the register flip-flops.

Section 207

FIG. 4b illustrates the different sections of address section 207. As shown, section 207 includes an input address section 207-1, an address decode section 207-2 and an address register section 207-4. The input address section 207-1 includes a set of manually selectable switches of block 207-10 which receive bus address signals BSAD04110 and BSAD06110. These switches select the high order bus address bit which selects the upper/lower 256K of memory when the system includes the full complement of 128K memory modules (i.e., modules A-D). When the memory modules are constructed using 64K chips, the top switch is placed in the closed position. This selects address bit 4 (signal BSAD04110) as the high order bus address bit. For 16K chips, the other switch is placed in the closed position which selects address bit 6.

Since it is assumed that the memory modules use 64K chips, the top switch is closed while the other switch is opened. The resulting high order bit signal BSADX6010 in addition to its complement along with the least significant bus address bits 22 and 21 are stored in a register 207-12. An inverter circuit 207-14 generates complement signal BSADX6000. The four signals are loaded into register 207-12 when address strobe signal ADDSTR000 is forced to a binary ZERO. This occurs when the memory is busy (i.e., accepts a bus cycle/a memory request).

The outputs of register 207-12 are applied as inputs to the section 207-2 in addition to sections 204 and 206. The input address section 207-1 also includes boundary detection circuits of block 207-15. The circuits include a NAND gate 207-16 which connects to the D input terminal of a D type flip-flop 207-19 via an AND gate 207-18. The flip-flop 207-19 latches up the output signal BOUNDY010 generated by gate 207-18 in response to each double fetch memory request when the signals BSDBPL010 and MEMBUZ010 are binary ONES. The NAND gate 207-16 receives the memory request address bits 22-17 from bus 10 and forces output detected boundary signal DBSA64000 to a binary ZERO when all of the address bits 22-17 are binary ONES. This, in turn, causes flip-flop 207-19 to switch from a binary ONE to a binary ZERO state when clock with MEMBUZ010 forcing signal MYBNY010 to a binary ZERO. In the other cases, signal DBSA64000 is a binary ONE which keeps flip-flop 207-19 to a binary ONE when clocked with MEMBUSY010. The signal MYBNDY010 is applied as an input to timing section 204.

As shown, the least significant address bit signals LSAD22210 and LSAD21210 are applied to the input terminals of a binary decoder circuit 207-20. The least significant bit address signal LSAD22210 and its complement signal LSAD22200 generated by an inverter circuit 207-22 are applied to sections 204 and 206. The high-order bit signal LSADX6210 is applied to the enable/gate input terminal of decoder circuit 207-20. The complement signal LSADX6200 is applied to the enable/gate input of another decoder circuit, not shown, together with address signals LSAD22210 and LSAD21210. This circuit has been omitted since it is assumed that the controller being described includes 256K of memory. This means that high order address signal LSADX6210 is always a binary ZERO. Therefore, decoder circuit 207-20 is always enabled for operation.

Each of the four decode outputs DECOD0000 through DECOD3000 connects to a different pair of the NAND gates 207-24 through 207-30. It will be noted that the zero decode signal DECOD0000 connects to the inputs of NAND gates 207-24 and 207-26 which generates the 0 and 1 row address strobe signals. Similarly, the 1 decode signal DECOD1000 connects to the inputs of NAND gates 207-26 and 207-28 which generate the 1 and 2 row address strobe signals. The next sequential decode signal DECOD2000 connects to the two NAND gates which generate the next pair of sequential row address strobe signals. Lastly, the last decode signal DECOD3000 connects to NAND gates 207-30 and 207-24 which generate the 3 and 0 row address strobe signals.

As shown, the even row address strobe signals DRAST0010 and DRAST2010 are applied to the RAM chips of the even stack units 210-20. The odd row address strobe signals DRAST1010 and DRAST3010 are applied to the RAM chips of the odd stack units 210-40.

The address register section 207-4 of section 207 is included for the sake of completeness. The apparatus of this section forms a part of the subject matter of copending patent application "Sequential Word Aligned Addressing Apparatus" previously referenced. Therefore, this section will only be discussed to the extent necessary for a complete understanding of the present invention.

FIG. 4b shows that the bus address signals BSAD05210 through BSAD20210 are applied via the bus receiver circuits of block 214 of FIG. 3 as inputs to different stages of a row address register 207-40 and a column address register 207-42. The enabling gate input terminals of both registers are connected to receive a memory busy signal MEMBUZ010 from section 204. The OC input terminal of row address register 207-40 is connected to receive a timing signal MRASCT000 generated by AND gate 207-44, inverter circuit 207-46 and NAND gate 207-47 in response to signals INITMM000, REFCOM000 and MCASTT010. The OC input terminal of column address register 207-42 is connected to receive a timing signal MCASCT000 generated by NAND gate 207-44 and NAND gate 207-50 in response to signals INITMM000, REFCOM000 and MCASTT010.

Each of the address registers 207-40 and 207-42 are constructed from D type transparent latch circuits such as those designated as SN74S373 previously discussed. As seen from FIG. 4b, the difference address output terminals of the registers of each set are connected in common in a wired OR arrangement for enabling the multiplexing of these address signals. As previously described, such multiplexing is accomplished by controlling the state of the signals applied to the output control (OC) input terminals of the registers 207-40 and 207-42.

More specifically, the output control (OC) terminals enable so-called tristate operation which are controlled by the circuits 207-44 through 207-50. When each of the signals MRASCT000 and MCASCT000 is in a binary ONE state, this inhibits any address signal from being applied at the Q output terminals of that register. As mentioned, this operation is independent of the latching action of the register flip-flops. Additionally, section 207-4 includes a 4-bit binary full adder circuit 207-54, conventional in design. The adder circuit 207-54 is connected to increment by one, the low order address bits 20 through 17. In greater detail, the input terminal A1-A8 receive signals MADD00110 through MADD03110. Binary ZERO signals are applied to input terminals B1-B8. An AND gate 207-56 generates a carry in signal MADDUC010 as a function of the states of the least significant address signals LSAD22210 and LSAD21210, signal INTREF000 and timing signal DLY060010.

Figure 4E:
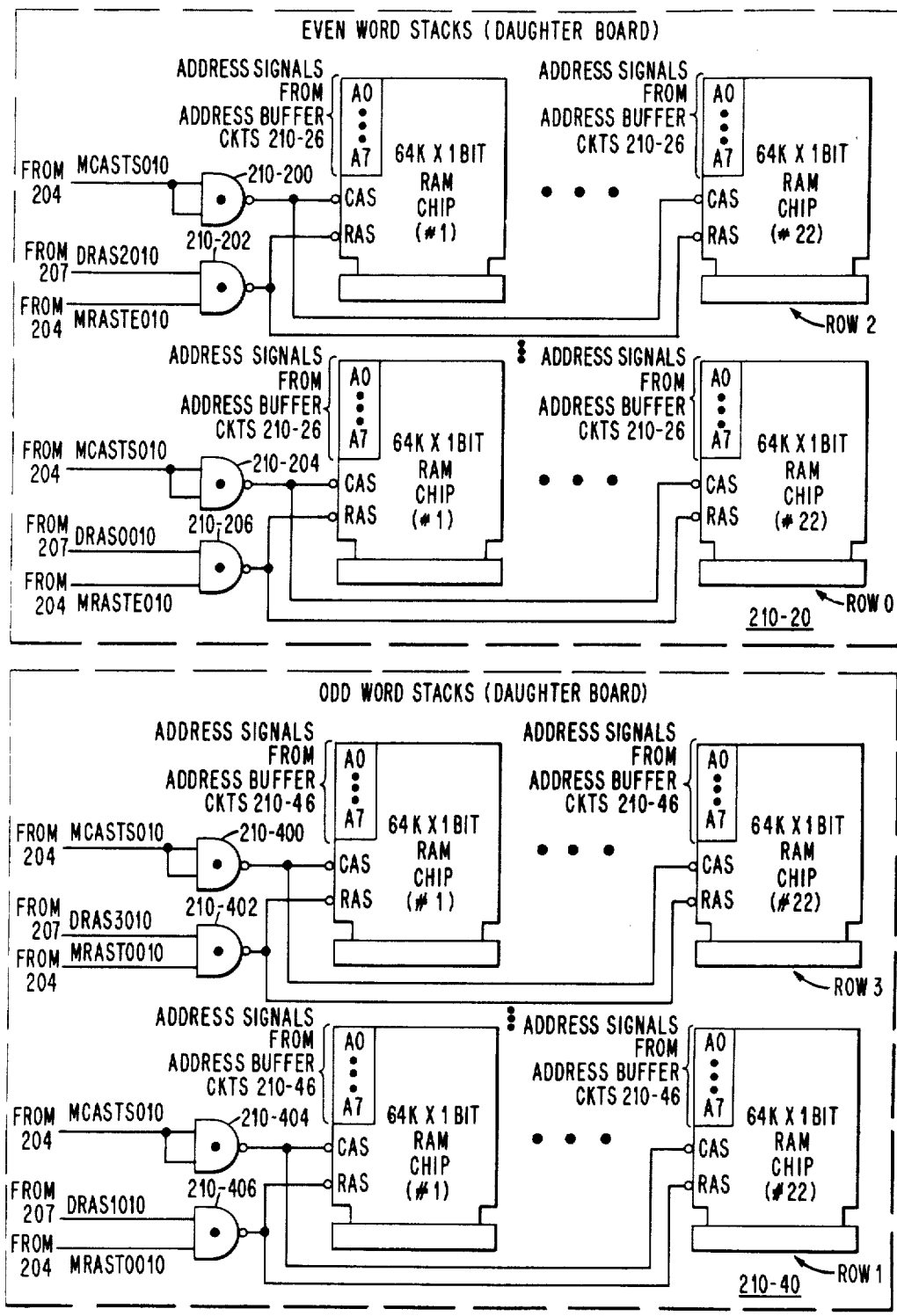

The incremented output signals MAD00111 through MADD0311 appearing at adder sum terminals S1-S8 are applied via address buffer circuits 210-26 to the even stack RAM chips of FIG. 4e. The same is true of signals MADD0410 through MADD07010. The odd stack RAM chips of FIG. 4e are connected to receive the address signals MADD0010 through MADD0710 via address buffer circuits 210-46.

Read/Write Control Section 208

A portion of the circuits of section 208 is shown in greater detail in FIG. 4c. As mentioned, the section 208 includes a register 208-10 and output gate circuits 208-14 and 208-16. The register 208-10 is a two stage D-type flip-flop register for storing signal BSWRIT10 which is representative of a read/write command and signal BSDBPL10 which is representative of a double word pull/fetch type command. These signals are latched when signal MYACKR010 from section 211 switches to a binary ONE. When any one of the signals REFCOM000, INITMM00 to BSMCLR00 switches to a binary ZERO, an AND gate 208-12 forces signal CLRMOD000 to a binary ONE which clears register 208-10 to a binary ZERO state.

The read mode signal READMM010 and double fetch signal MDFETCH010 are applied to different ones of the AND gates 208-14 and 208-16. The series connected gates 208-14 and 208-16 operate to generate the double word pull/fetch signal DFETCH010. The AND gate 208-14 forces signal DFHINH000 to a binary ONE during a read cycle (i.e., READMM010=1) in the absence of a refresh cycle (i.e., REFCOM000=1). This causes AND gate 208-16 to force signal DFETCH010 to a binary ONE indicative of a double word pull cycle of operation. The double fetch signals DFETCH010, MDFETCH010 and MDFETCH000 are applied as inputs to sections 204 and 211, as shown. Also, signal READMM010 is used to generate read command signals in a conventional manner which are applied to the units 210-20 and 210-40. For further details, reference "A Dynamic Memory System which Includes Apparatus for Performing Refresh Operations in Parallel with Normal Memory Operations" cited above.

Bus Control Section 211

A portion of the circuits of section 211 is shown in FIG. 4d. These circuits enable the pair of data words stored in even and odd data registers 206-8 and 206-10 to be transferred to bus 10 during successive bus cycles of operation.

Before describing these circuits, a brief explanation of the operation of the bus circuits of section 211 will be given. These circuits are described in detail in the previously referenced patent application of John L. Curley, et al. The section 211, as other units which connect to bus 10, include a user flip-flop (not shown) which connects to a request flip-flop (not shown). The circuits shown in FIG. 4d provide an output to user flip-flop, in addition to the bus line BSDBL via the circuits of block 214.

When a timing signal from the timing generator circuits of section 204 switches from a binary ZERO to a binary ONE, the user flip-flop is switched to a binary ONE when the memory accepts a request and is not performing a refresh cycle. The stored request signal is applied to the input of a request flip-flop, not shown. When this flip-flop is switched to a binary ONE, its output is applied to the bus tie breaking network in addition to the bus driver/receiver circuits of block 214 whereupon it is inverted and is applied to bus line BSREQT. When line BSREQT is forced to a binary ZERO, it prevents any other stored requests of other units from setting their corresponding request flip-flops. Since the memory subsystem has the highest priority, this results in the switching of a grant flip-flop to a binary ONE. This results in signal MYDCNN010 being switched to a binary ONE. The signal MYDCNN010 is inverted by the driver/receiver circuits of block 214 and is applied to line BSDCNN. In the case of a double fetch operation, two successive signals MYDCNN010 are generated which enables the two data words read out from units 210-20 and 210-40 in response to the memory request to be transferred.

Now referring to FIG. 4d, it is seen that the circuits include a double fetch history flip-flop 211-10 and associated input circuits which include NAND gates 211-12, 211-14 and 211-16 in addition to an inverter circuit 211-18. The associated output circuits include a series connected NAND gate 211-20, inverter circuit 211-22 and NOR gate 211-24 generate signal USERES000 which is applied to the reset input terminal of the user flip-flop. They also include an inverter circuit 211-26 which generates signal DWRESP010 which is inverted by the driver/receiver circuits of block 210 and applied as signal BSDBL000 to bus line BSDBL.

Briefly discussing the operation of these circuits, it is seen that when signals DWDSET010 and DFETCH010 are forced to binary ONES, NAND gate 211-12 switches signal DWDSET000 to a binary ZERO. This switches double fetch history flip-flop 211-10 to a binary ONE state. This flip-flop remembers that the memory subsystem is responding to a double fetch request so that when the memory subsystem is granted access to the bus, it responds and forces the double fetch line BSDBPL to a binary ZERO during a first of two response cycles. This signals the requesting unit that the first word of the two word pair is being transferred.

When flip-flop 211-10 is set to a binary ONE, timing signal DWDHIS000, generated in response to signal MYACKR010 is forced to a binary ZERO. This inhibits NAND gate 211-20 from switching to a binary ZERO when the memory subsystem switches signal MYDCNN010 to a binary ONE state. Therefore, signal STREQR010 is forced to a binary ZERO by inverter 211-22 which causes NOR gate 211-24 to force reset signal USERES000 to a binary ONE. This inhibits the resetting of the user flip-flop which, in turn, inhibits the resetting of the memory request flip-flop. Therefore, the bus request line BSREQT remains a binary ZERO. Therefore, the memory subsystem continues to request a bus cycle.

When signals MYDCNN010 and DWDHIS010 are both binary ONES, NAND gate 211-14 forces signal DWRESP000 to a binary ZERO. This causes inverter 211-26 to switch signal DWRESP010 to a binary ONE. The signal DWRESP010 is inverted by the driver/inverter circuits of block 214 and forces the double fetch bus line BSDPL to a binary ZERO.

Also, signal DWRESP000 is applied to the clock input (C) terminal of the flip-flop 211-10 and resets the flip-flop to a binary ZERO state in response to signal DWDHIS000 being forced to a binary ONE. When signal DWDHIS000 is switched to a binary ONE, this enables NAND gate 211-20 to switch signal STREQR000 to a binary ZERO in response to the next occurrence of signal MYDCNN010. This causes NOR gate 211-24 to force signal USERES000 to a binary ZERO which resets the user flip-flop to a binary ZERO. This, in turn, resets the request flip-flop which results in the bus request line BSREQT being switched to a binary ONE.

It will also be noted that when flip-flop 211-10 resets to a binary ZERO, signal DWDHIS010 causes NAND gate 211-14 to switch signal DWRESP000 to a binary ONE. This causes inverter 211-26 to switch signal DWRESP010 to a binary ZERO. The signal DWRES010 is inverted and forces the double fetch bus line BSDPL to a binary ONE.

Memory Units 210-20 and 210-40—FIG. 4e

As previously discussed, the even word and odd word stacks of blocks 210-20 and 210-40 are shown in greater detail in FIG. 4e. These stacks include two rows of 22 64K×1-bit RAM chips as shown. The chips and associated gating circuits are mounted on a daughter board. Each daughter board includes 4, 2 input positive NAND gates (e.g. 210-200 through 210-206 and 210-400 through 210-406) which are connected to receive the row and column timing signals from section 204 and the row decode signals from section 207. Only those chip terminals pertinent to an understanding of the present invention are shown. The remaining terminals, not shown, are connected in a conventional manner. For further information, reference may be made to the copending patent application "Rotating Chip Selection Technique and Apparatus", invented by Chester M. Nibby, Jr. and William Panepinto, Jr., Ser. No. 921,292, filed on July 3, 1978 and assigned to the same assignee as named herein.

DESCRIPTION OF OPERATION

Figure 5:
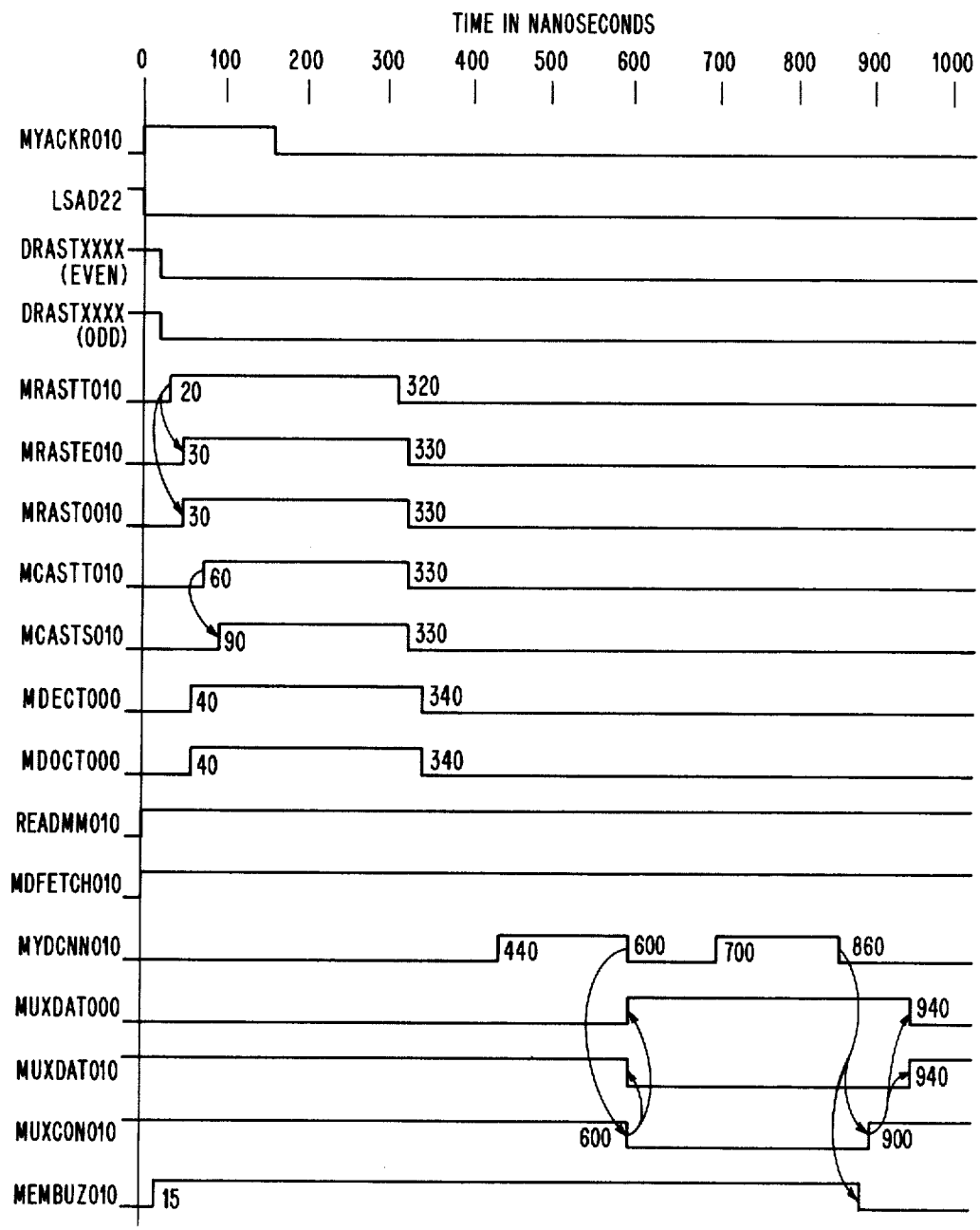
FIG. 5 is a timing diagram used in describing the operation of the present invention.
Figure 6A:
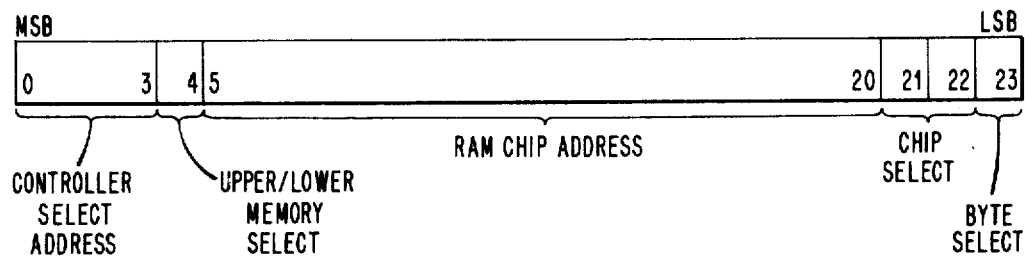
FIG. 6a illustrates the format of the address applied to the memory subsystem of FIG. 1.
Figure 6B:
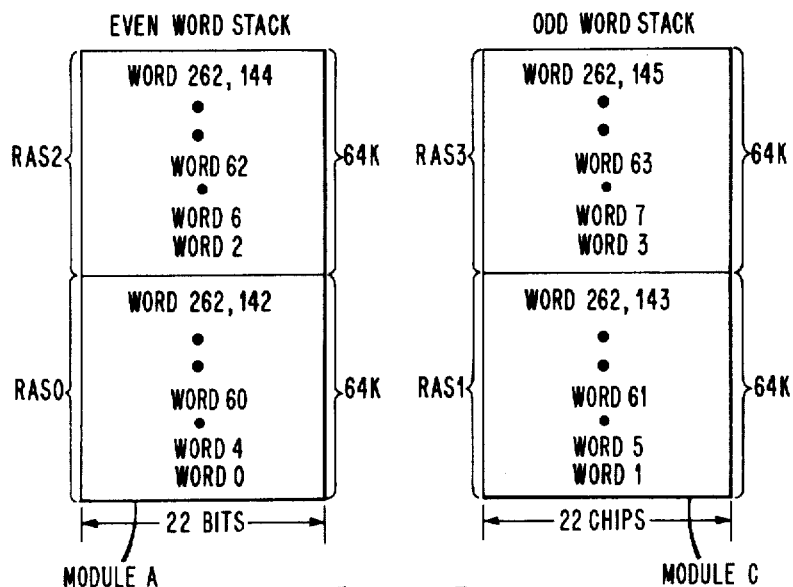
FIG. 6b illustrates the organization of memory modules of FIG. 1.

With reference to FIGS. 1-6b, the operation of the preferred embodiment of the present invention will now be described with particular reference to the timing diagram of FIG. 5. It will be assumed that each of the units 210-2 and 210-4 include a single 128K stack memory unit as shown in FIGS. 4e and 6b. It will be obvious that each of the units 210-2 and 210-4 can include any number of stack units with the provision that both of the units 210-2 and 210-4 include the same number of stack units.

Before discussing an example of operation with reference to FIG. 5, reference is first made to FIGS. 6a and 6b. FIG. 6a illustrates the format of the memory addresses applied to the memory subsystem as part of each memory read or write request. The high order/most significant bit positions are coded to identify the memory module/controller to process the request. Address bit 4 is used to select which 256K half (i.e., upper or lower half) of controller memory is being accessed. These address bits are processed by the circuits of memory subsystem 20 and are not provided to the RAM chips. Processing proceeds in a conventional manner such as disclosed in the above cited copending patent applications.

FIG. 6b illustrates the word memory organization of modules A and C of FIG. 1. As shown, modules A and C provide 256K words of memory. FIG. 6b will be referenced to explain the manner in which the apparatus of the present subsystem responds to boundary conditions.

Address bits 5-20 specify the address of the 22-bit storage location within the RAM chips being addressed. As explained in greater detail herein, these 16 address bits are multiplexed into 8 address inputs and applied via the address buffer circuits of blocks 210-26 an 210-46 to the address input terminals A0-A7 of the RAM chips of FIG. 4e.

The least significant address bits 21-22 are coded to select which row of RAM chips are being addressed. As explained herein in greater detail, these bits are decoded and used to generate a pair of row address strobe (RAS) signals which latch the 8-bit row addresses into the desired row of RAM chips within each memory stack.

Memory Requests

As mentioned previously, CPU 40 can generate the different types of memory requests. For example, CPU 40 initiates a memory white operation by forcing the BSWRIT and BSMREF lines true and applying address and data to the BSAD and BSDT lines, respectively. In the system of FIG. 1, all memory write operations require a single bus cycle and involve the transfer of a single word. Hence, CPU 40 places the BSDPL line in a false state signaling the memory that it is a single word request.

In the case of memory read operations, CPU 40 can signal if it wants a single word or two sequential words. Reading a single word from memory requires two bus cycles. During the first cycle, the CPU 40 as the master requests the information by forcing the BSMREF line true and applying address and control information to the BSAD and BSDT lines, respectively. By forcing the BSWRIT line false, CPU 40 signals the slave unit that the memory operation requires a response. Also, CPU 40 signals its identity to the slave unit and tags the request as a single fetch request by applying its channel number and a function code of $00_{16}$ to the BSDT lines.

During the second bus cycle designated by the slave forcing line BSSHBC true, the fetched data word is returned to CPU 40 via the BSDT lines. The memory or slave also returns the $00_{16}$ function code to CPU 40 via the BSAD lines together with its address or channel number. This enables the CPU 40 to distinguish between memory requests since there can be both double word fetch and single word fetch memory requests to different memory module units outstanding at the same time.

Reading two sequential words from memory requires three bus cycles when both words are in memory. When making a double fetch request, CPU 40 also forces the BSDBPL line true. During the second bus cycle, the memory, as master, forces the BSDBPL line true indicating to the CPU 40 that another word is to follow. During the third bus cycle, the memory delivers the second word.

FIG. 5 illustrates diagrammatically the relationships between the different timing and control signals generated by the memory subsystem 20 during a double fetch memory operation. It is assumed that CPU 40 generates a double word fetch read command request. This results in the switching of signal MYACKR010 to a binary ONE. As seen from FIG. 5, all of the signals are referenced to signal MYACKR010 which starts a memory cycle of operation. The signal MYACKR010 causes the circuits of block 204 to force the memory busy signal MEMBUZ010 to a binary ONE indicating that the memory subsystem has begun a memory cycle of operation (i.e., memory is busy).

Referring to FIG. 4c, it is seen that signal MYACKR010 clocks the states of the bus write BSWRIT and double word fetch BSDBPL lines into register 208-10. Since this is a double word fetch read request, signal BSWRIT010 is a binary ZERO while signal BSDBPL010 is a binary ONE. Accordingly, signals BSWRIT010 and BSDBPL010, respectively, force signals READMM010 and MDFETCH010 to binary ONES as shown in FIG. 5.

Since there is no refresh command (i.e., signal REFCOM000 is a binary ONE), AND gate 208-14 forces signal DFHINH000 to a binary ONE. This causes AND gate 208-16 to force signal DFETCH010 to a binary ONE.

In response to the memory busy signal MEMBUZ010, the bus address signals BSAD05210 through BSAD20210 are loaded into row address register 207-40 and column address register 207-42. Also, signal MEMBUZ010 switches signal ADDSTR000 of FIG. 4b to a binary ZERO. This loads the least significant address bit signals BSAD22110 and BSAD21110, in addition to signal BSADX610 into register 207-12.

As seen from FIG. 4b, the stored address signals LSAD22210 and LSAD21210 are decoded by decoder circuit 207-20 which is enabled for operation by signal LSADX6210. The decoder circuit 207-20 forces one of its decode signals to a binary ZERO. This signal conditions one of the pairs of NAND gates to force even and odd DRAST signals to binary ONES as shown in FIG. 5. Thus, the decode of the least significant address bits LSAD22-21 results in the simultaneous generation of the pair of row address strobe signals. As seen from FIG. 4e, the even RAS signal is applied to the input of the even word stack 210-20. The odd RAS signal is applied to the input of the odd word stack 210-40. When the timing signals MRASTE010 and MRAST010 are generated, the row address signals applied via the address buffer circuits to the terminals A0-A7 of both rows of RAM chips are stored within stacks 210-20 and 210-40.

In greater detail, the timing circuits of FIG. 4a, in response to signal MYACKR010, begin a cycle of operation during which timing signals TTAP01010 and TTAP02010 are generated. These signals cause gates 204-1, 204-3, 204-10 and 204-17 to generate signals MRASTT010, MCASTT010, MRASTE010 and MRAST0010, respectively, at the times shown in FIG. 5. As mentioned, the row timing signals MRASTE010 and MRAST0010 together with corresponding ones of the row decode signals generate even and odd row address strobe signals which are applied to the RAS terminals of both rows of RAM chips. At that time, signal MCASTT010 is a binary ZERO. From FIG. 4b, it is seen that the output signal MRASCT000 from NAND gate 207-47 is a binary ZERO at this time (i.e., when signal MCASTT010 is a binary ZERO). This conditions row address register 207-40 to apply the bus address signals at its inputs to its output terminals. Accordingly, both rows of RAM chips latch or store the 8-bit row address signals applied to the A0-A7 terminals.

As seen from FIG. 4a, timing signal MCASTT010 causes delay network 204-19, gates 204-18 and 204-20 to generate signal MCASTS010 at the time shown in FIG. 5. The signal MCASTS010 is applied via NAND gates 210-200, 210-204, 210-400 and 210-404. This results in a column address strobe signal being applied to the CAS terminals of the rows of RAM chips. Accordingly, rows of RAM chips latch or strobe the 8-bit column address signals applied to the A0-A7 terminals.

As seen from FIG. 4b, the above address corresponds to the bus address contents of column address register 207-42. That is, when signal MCASTT010 switches to a binary ONE, signals MRASCT000 and MCASCT000 switch to a binary ONE and binary ZERO, respectively. The result is that the bus address signals BSAD0520 and BSAD07210 through BSAD13210 are applied to the output terminals of register 207-42. At the same time, register 207-40 is inhibited from applying bus address signals to its output terminals.

The memory address bits 5-20 cause the contents of the storage locations storing the pair of words specified to be accessed. This results in the even word and odd word being loaded into even data and odd data registers 206-8 and 206-10, respectively, in response to signals MDECT000 and MDOCT000. These signals are generated at the time shown in FIG. 5.

In accordance with the teachings of the present invention, the even and odd words stored in registers 206-8 and 206-10 are transferred to bus 10 under the control of the circuits of sections 204 and 211. It will be assumed that the memory subsystem 20 has been granted access to bus 10.

Referring to FIG. 4d, it is seen that signals DWDSET010 and DFETCH010 switch the double fetch history flip-flop 211-12 to a binary ONE state.

This causes signal DWRESP000 to force the double fetch line BSDBPL to a binary ZERO during the first of two response cycles. This signals the CPU 40 that the first word of the two word pair is being transferred.

In response to the switching of the grant flip-flop to a binary ONE indicating that subsystem 20 has been granted access, signal MYDCNN010 switches to a binary ONE. Signal MYDCNN010 is inverted by the driver/receiver circuits of block 214 and forces bus line BSDCNN to a binary ZERO. This signals the occurrence of a data cycle to CPU 40.

It will be assumed that the least significant bit LSAD22 is a binary ZERO. This means that the even word is the first word to be transferred to bus 10 during the first data cycle. Referring to FIG. 4a, it is seen that flip-flop 204-26 is in a binary ONE state. As shown in FIG. 5, exclusive OR circuit 206-28, in response to signals LSAD22000 and MUXCON010, maintains signal MUXDAT000 in a binary ZERO state. At the same time, exclusive OR circuit 204-30 holds signal MUXDAT000 in a binary ONE state.

The binary ZERO state of signal MUXDAT000 is applied to the OC terminal of even data word register 206-8. This enables the even word register contents to be applied as an output to the bus 10 via circuits 206-12. At the same time, signal MUXDAT010 inhibits register 206-8 from applying signals to its output terminals.

During this first response cycle, the leading edge of signal MYDCNN010 causes NAND gate 211-14 to force double word response signal DWRESP000 to a binary ZERO. The signal DWRESP000 is inverted and causes the driver/receiver circuits of block 214 to force line BSDBPL to a binary ZERO. When signal MYDCNN010 is applied to NAND gate 211-20, signal DWDHIS000 inhibits it from forcing signal STREQR000 to a binary ZERO preventing the resetting of the memory user flip-flop. Therefore, memory subsystem 20 continues to retain control of the bus 10.

Signal DWRESP000 also causes double fetch history flip-flop 211-10 to switch to a binary ZERO by clocking its binary ZERO output signal DWDHIS000 at its D input terminal. This forces signal DWDHIS000 to a binary ONE enabling NAND gate 211-20 to switch signal STREQR000 to a binary ZERO state when the second MYDCNN010 signal is applied.

Referring to FIG. 5, it is seen that the trailing edge of signal MYDCNN010 causes flip-flop 204-26 to switch to a binary ZERO state. More specifically, referring to FIG. 4a, it is seen that since signal MDFETCH000 is a binary ZERO, flip-flop 204-26 switches state in response to the positive going transition of complement signal MYDCNN000. This, in turn, forces signal MUXCON010 to a binary ZERO state.

The signal MUXCON010 conditions exclusive OR circuits 204-28 and 204-30 to switch the states of signals MUXDAT000 and MUXDAT010 as shown in FIG. 5. That is, now signal MUXDAT010 is a binary ZERO. This enables the odd data word register 206-8 to apply the odd word register contents as an output to bus 10 via circuits 206-12.

Since the user flip-flop was not reset during the first cycle, the memory subsystem 20 generates another MYDCNN010 signal as shown in FIG. 5. Since the double fetch history flip-flop 211-10 was reset at the end of the first response cycle, signal MYDCNN010 causes NAND gate 211-20 to force signal USERES000 to a binary ZERO which resets the user flip-flop and request flip-flop. Also, since flip-flop 211-10 has been reset, signal DWRESP000 is not forced to a binary ZERO which causes line BSDBPL to be in a binary ONE state indicative that no other data words are to be transferred.

At the trailing edge of signal MYDCNN010, flip-flop 204-26 is switched to a binary ONE state as shown in FIG. 5. At this time, signals MUXDAT000 and MUXDAT010 are returned to their original states. Signal MYDCNN010 also causes MEMBUZ010 to switch to a binary ZERO which completes the memory double word fetch cycle of operation.

It will be appreciated that the same sequence of operations occur when least significant bit LSAD22 is a binary ONE. This causes the transfer of the odd word during the first response cycle (i.e., during first MYDCNN010) since signals MUXDAT000 and MUXDAT010 have the opposite states. During the second response cycle, the even word is transferred to bus 10.

Accordingly, the memory subsystem of the present invention, in response to each double fetch command, operates to read out simultaneously a pair of words into the data registers 206-8 and 206-10 and transfer each of the words to bus 10 over successive bus cycles of operation. Also, memory addressing proceeds as described. For the least significant address bit values 00 through 10, the RAM chip address bits 5-20 remain the same. However, each time the least significant address bits have the value "11", this creates a subboundary address condition. As explained in the copending referenced patent application, "Sequential Word Aligned Address Apparatus", this subboundary condition is extended by adder circuit 207-54 of FIG. 4b. The adder circuit 207-54 increments by one the row address signals applied to the RAM chips of the even memory unit 210-20 when the least significant address bits 21-22 have the value "11". The RAM chips of the odd memory unit 210-40 receive the unincremented row address.

For each double fetch operation, addressing proceeds in the above manner until the memory request address specifies word 63 or a multiple of 63 within the modules A and C of FIG. 6b. At this point, the range of the adder circuit 207-54 is exceeded. Since it is not possible to provide the correct row address, the boundary circuits of block 207-15 of FIG. 4b are operative to detect the boundary address condition and switch signal MYBNDY010 to a binary ZERO. That is, the all ONES value of bus address bits 22-17 causes NAND gate 207-16 to switch to a binary ZERO. When AND gate 207-18 is enabled by double fetch signal BSDBPL010 from bus 10, this switch flip-flop 207-18 from a binary ONE to a binary ZERO state.

From FIG. 4a, it is seen that signal MYBNDY010 forces signal RASINH000 to a binary ONE. This conditions NAND gates 204-8 and 204-14 to generate row address strobe inhibit signals ERASIH000 and ORASIH000 as a function of the state of least significant address bit 22. Since bit 22 is a binary ONE, signal LSAD22200 is a binary ZERO which causes NAND gate 204-14 to switch signal ORASIH000 to a binary ONE. At the same time, NAND gate 204-8 switches signal ERASIH000 to a binary ZERO.

The above causes timing section 204 to generate only those timing signals required for accessing odd memory module 210-40. That is, AND gate 204-17 generates timing signal MRAST0010 which causes the row address to be latched into the rows of RAM chips of memory module C. Following the latching of the column address, the contents of storage location 63/multiple of word 63 defined by the row and column address is accessed and stored in odd data register 206-10 in response to timing signal MDOCT000 generated by AND gate 204-15. Thereafter, signal MUXDAT010 conditions the odd data register 206-10 to apply the odd word 63/multiple of module C to bus 10.

In addition to the above, it is seen from FIG. 4d that signal DBSA64000 when forced to a binary ZERO resets double fetch history flip-flop 211-10 via NAND gate 211-16 and inverter circuit 211-18 by forcing signal DWDRES000 to a binary ZERO. Resetting occurs after flip-flop 211-10 has been set to a binary ONE by signal DWDSET000 before the first response cycle of the memory subsystem. Therefore, NAND gate 211-14 does not force the double fetch response signal DWRESP000 to a binary ZERO. Accordingly, memory subsystem 20 does not force the double fetch line BSDBPL to a binary ZERO during the transfer of the odd data word indicating to the requesting unit that a second word is not being transferred.

From the above, it is seen how the arrangement of the present invention is able to provide simultaneous access to a pair of memory modules for read out of a pair of words to a single word bus over a successive bus cycle in response to a double fetch memory request. The arrangement requires a minimum of circuit complexity and operates without any adverse affect on memory system performance.

It will be appreciated by those skilled in the art that many changes may be made to the illustrated embodiment.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A memory subsystem for use in a system including a processing unit coupled to a single word bus in common with said subsystem for transfer of information therebetween during bus transfer cycles of operation, said processing unit being operative to generate memory requests on said bus to said subsystem, each of said requests including a multibit address and certain ones of said requests being coded to specify a predetermined type of memory operation, said memory subsystem comprising:

a plurality of independently addressable memory module units, each memory unit including a plurality of rows of random access memory chips;

address register means for storing a plurality of least significant address bits of each said address;

sequential decode and addressing means coupled to said address register means, to said bus and to said memory module units, said means being operative to generate simultaneously a plurality of sequential row address select signals and corresponding sequential addresses from said multibit address in response to said number of least significant address bits of each memory request enabling simultaneous access to a plurality of sequential storage locations in the rows of chips specified by said plurality of address select signals;

read/write control means coupled to said bus, said control means including means for storing signals indicative of the type of memory request received from said processing unit;

a plurality of tri-state output register means connected in common with said single word bus and said tri-state output register means coupled to different ones of said memory module units for receiving the plurality of data words read out from said plurality of sequential storage locations during a single bus cycle in response to said read type request; and, control means coupled to said plurality of tri-state output register means, to said address register means and to said read-write control means, said control means being operative in response to signals from said read/write control means indicative of said predetermined type of memory opeation to condition said plurality of tri-state output register means to apply in succession each of said plurality of data words to said bus for transfer to said processing unit over successive bus cycles of operation.

2. The memory subsystem of claim 1 wherein said subsystem further includes:

timing means for generating a predetermined sequence of timing signals in response to each memory request, said timing means being coupled to said plurality of memory module units and to said plurality of tri-state output register means, said plurality of said output register means being conditioned by certain ones of said sequence of timing signals to store simultaneously said plurality of data words accessed from the storage locations designated by said sequential addresses in said rows of chips specified by said plurality of address select signals.

3. The memory subsystem of claim 2 wherein said read/write control means includes:

a number of bistable means coupled to said bus, a first one of said number of bistable means being connected to store a first signal indicating when said memory request specifies said predetermined type of operation, said first bistable means being coupled to said control means, said control means including a plurality of gating means, each being connected to a different one of said pair of register means, said plurality of gating means in response to said first signal to generate a sequence of control signals for conditioning said plurality of said output register means to transfer each of said data words in the order specified by the coding of the least significant address bit.

4. The subsystem of claim 3 wherein each memory request coded to specify said predetermined type of memory operation causes the fetching of a plurality of words from a corresponding number of word locations in said plurality of memory module units.

5. The subsystem of claim 3 wherein said control means further includes bistable means having a plurality of inputs and an output, one of said inputs being coupled to said first bistable means and another input to said bus, and said output being connected to said first and second gating means, said bistable means when in a first stage conditioning one of said plurality of gating means to switch to said first state so as to generate a first one of said sequence of control signals for conditioning one of said tri-state output register means to apply a first data word to said bus during a first one of said bus cycles and said bistable means being enabled by said first signal to switch from said first state to a second state in response to a first signal from said bus signalling the completion of said first bus cycle, another one of said plurality of gating means being conditioned by said bistable means when in said second state to switch to said first state so as to generate a second one of said sequence of control signals for conditioning another one of said tri-state output register means to apply a second data word to said bus during a second one of said bus cycles.

6. The subsystem of claim 5 wherein each of said plurality of gating means includes an exclusive OR gate.

7. The subsystem of claim 6 wherein said bistable means is operative when enabled by said first bistable means in response to a second signal signalling the completion of said second bus cycle from said bus to switch from said second state to said first state so as to return said plurality of gating means to their initial states for processing the next memory request.

8. The subsystem of claim 2 wherein said subsystem further includes boundary circuit means coupled to receive predetermined address bits of said memory request and a signal from said bus indicative of said predetermined type of memory operation, said boundary circuit including means coupled to said timing means for generating an output boundary condition signal in response to each predetermined type of memory operation when said predetermined address bits have a predetermined value for enabling transfer of one of said data words.

9. The subsystem of claim 8 wherein said timing means includes a first pair of gating means coupled to receive signals representative of the least signficant address bit and its complement from said address register means, said first pair of gating means logically combining said output boundary condition signal with said least significant address bit and said complement for generating a pair of said other timing signals, said first pair of gating means being conditioned by said boundary condition signal to generate one of said certain ones of timing signals specified by the coding of said least significant address bit for read out of a first one of said plurality of data words from a storage location within a row of chips of one of said plurality of memory module units.

10. The subsystem of claim 9 wherein said subsystem further includes bus control means coupled to said read/write control means, to said bus and to said timing means and to said boundary circuit means, said bus control means including:
bistable means having a plurality of input terminals and output terminals;
a first one of said input terminals being coupled to said timing means and a second one of said input terminals being coupled to said boundary circuit means and one of said output terminals being coupled to said bus; and,
said read/write control means including:
bistable means coupled to said first input terminal and to said bus, said bistable means for storing a first signal indicating when said memory request specifies said predetermined type of operation; and,
said bistable means being conditioned by said first signal to switch to a first state for generating at said output terminal a response signal for applying to said bus during the transfer of each data word indicating continued transfer of data words and said second input terminal in response to said boundary condition signal generating during said predetermined type of operation conditioning said bistable means to switch from said first state to a second state inhibiting the generation of said response signal for indicating that only a first word of said plurality of data words is being transferred.

11. A memory subsystem for use in a system including a processing unit coupled to a single word bus in common with said subsystem for transfer of information therebetween during bus transfer cycles of operation, said processing unit being operative to generate memory requests on said bus to said subsystem, each of said requests including a multibit address having row and column addresses and certain ones of said requests being coded to specify a predetermined read type of memory operation, said memory subsystem comprising:
a pair of independently addressable memory module units, each memory unit having a set of input address lines and including a plurality of rows of random access memory chips;
an address register for storing a plurality of least significant address bits of each said address;
sequential decode means coupled to said address register and to said plurality of rows of chips of said memory module units, said decode means being operative to generate a pair of sequential row address select signals in response to said number of least significant address bits of each memory request;
sequential addressing means coupled to said bus, to said address register and to said sets of input address lines, said addressing means being operative in response to each read memory request to apply simultaneously to said set of input address lines, sequential addresses generated by modifying said row and column addresses as a function of the coding of said number of least significant address bits enabling simultaneous read out of a pair of sequential data words from said rows of said chips specified by said pair of address select signals in response to said predetermined read type of operation request;
read/write control means for generating read/write commands, said control means being coupled to said bus and to said memory module units, said control means for storing signals indicative of the type of memory request received from said processing unit;
a pair of tri-state output registers connected to store said pair of sequential data words read out from said memory module units during a single bus cycle in response to said predetermined read type request and said registers being connected in common to said single word bus; and,
control means coupled to said pair of tri-state registers, to said address register and to said read/write control means, said control means being operative in response to signals from read/write control means indicative of said predetermined type of memory request to condition said pair of output registers to apply in succession each of said pair of data words to said single word bus for transfer to said processing unit over successive bus cycles of operation.

12. The memory subsystem of claim 11 wherein said subsystem further includes:

timing means for generating a predetermined sequence of timing signals in response to each memory request, said timing means being coupled to said pair of memory module units, and to said pair of tri-state output registers, said pair of memory module units and said output registers respectively being conditioned by certain ones of said sequence of timing signals to read out and then store simultaneously said pair of data words accessed from the storage locations designated by said sequential addresses of said rows of chips specified by said pair of address select signals.

13. The memory subsystem of claim 12 wherein said read/write control means includes:
   a number of bistable means coupled to said bus, a first one of said number of bistable means being connected to store a first signal indicating when said memory request specifies said predetermined type of read operation, said first bistable means being coupled to said control means, said control means including a plurality of gating means, each being connected to a different one of said pair of registers, said plurality of gating means in response to said first signal to generate a pair of control signals for conditioning said registers to transfer each of said data words in the order specified by the state of the least significant address bit.

14. The subsystem of claim 13 wherein each memory request coded to specify said predetermined read type operation causes the fetching of a pair of words from a word location within each of said pair of memory module units.

15. The subsystem of claim 13 wherein said control means further includes bistable means having a plurality of inputs and an output, one of said inputs being coupled to said first bistable means and another input to said bus, and said output being connected to said first and second gating means, said bistable means when in a first state conditioning one of said plurality of gating means to switch to said first state so as to generate a first one of said pair of control signals for conditioning a first one of said pair of tri-state registers to apply a first data word to said bus during a first one of said bus cycles and said bistable means being enabled by said first signal to switch from said first state to a second state in response to a first signal from said bus signalling the completion of said first bus cycle, another one of said plurality of gating means being conditioned by said bistable means when in said second state to switch to said first state so as to generate a second one of said pair of control signals for conditioning a second one of said pair of tri-state registers to apply a second data word to said bus during a second one of said bus cycles.

16. The subsystem of claim 15 wherein each of said plurality of gating means includes an exclusive OR gate.

17. The subsystem of claim 16 wherein said bistable means is operative when enabled by said first bistable means in response to a second signal signalling the completion of said second bus cycle from said bus to switch from said second state to said first state so as to return said plurality of gating means to their initial states for processing the next memory request.

18. The subsystem of claim 12 wherein said subsystem further includes boundary circuit means coupled to receive predetermined address bits of said memory request and a signal from said bus indicative of said predetermined read type of memory operation, said boundary circuit including means coupled to said timing means for generating an output boundary condition signal in response to each predetermined read type of memory operation when said predetermined address bits have a predetermined value for enabling transfer of one of said data words.

19. The subsystem of claim 18 wherein said timing means includes a first pair of gating means coupled to receive signals representative of the least significant address bit and its complement from said address register means, said first pair of gating means logically combining said output boundary condition signal with said least significant address bit and said complement for generating a pair of said other timing signals, said first pair of gating means being conditioned by said boundary condition signal to generate one of said certain ones of timing signals specified by the coding of said least significant address bit for read out of a first one of said pair of data words from a storage location within a row of chips of one of said pair of memory module units.

20. The subsystem of claim 19 wherein said subsystem further includes bus control means coupled to said read/write control means, to said bus and to said timing means and to said boundary circuit means, said bus control means including:
   bistable means having a plurality of input terminals and output terminals;
   a plurality of input gating means coupled to said input terminals, a first one of said gating means being coupled to said timing means and a second one of said gating means being coupled to said boundary circuit means; and,
   output circuit means coupled to said output terminal; and,
   said read/write control means including:
   a plurality of bistable means, a first one of said plurality of bistable means being coupled to first gating means and to said bus for storing a first signal indicating when said memory request specifies said predetermined type of read operation, a second one of said bistable means being coupled to said bus for storing a second signal indicating whether said memory request specifies a read or write type memory operation; and
   logic circuit means coupled to said first and second bistable means and to said second one of said gating means, said logic circuit means logically combining said first and second signals to generate an output signal designating said predetermined read type of operation, said bistable means being conditioned by said output signal to switch to a first state for conditioning a first one of said output circuit means to generate a response signal on said bus concurrent with the transfer of each data word indicating continued transfer of data words and said second gating means being operative in response to said boundary condition signal generated in response to said request specifying said predetermined type of read operation to switch said bistable means from said first state to a second state inhibiting said first one of said output circuit means from generating said response signal, indicating that only a first word of said pair of data words is being transferred in response to said request.

21. A memory subsystem for use in a system including a processing unit coupled to a single word bus in common with said subsystem for transfer of information therebetween during bus transfer cycles of operation, said processing unit being operative to generate memory requests on said bus to said subsystem, each of said requests including a multibit address having row and column addresses and certain ones of said requests being coded to specify a predetermined read type of memory operation for fetching information within said memory subsystem, said memory subsystem comprising:

a pair of independently addressable memory module units, each memory unit including a plurality of rows of random access memory chips, for providing storage of data words, one module unit including the even numbered rows containing storage locations having even addresses and the other module unit including the odd numbered rows containing storage locations having odd addresses;

an address register for storing a plurality of least significant address bits of each said address;

sequential decode means coupled to said address register and to said plurality of rows of chips of said memory module units, said decode means being operative to generate a pair of odd and even sequential row address select signals in response to said number of least significant address bits of each memory request;

sequential addressing means coupled to said bus, to said address register means and to said sets of input address lines, said addressing means being operative in response to each read memory request to apply simultaneously to said set of input address lines, sequential addresses generated by modifying said row and column addresses as a function of the coding of said number of least significant address bits for enabling simultaneous read out of a pair of sequential data words from odd and even storage locations within said rows of said chips specified by said pair of odd and even address select signals;

read/write control means coupled to said bus, said control means including means for storing signals indicative of the type of memory request received from said processing unit;

a pair of tri-state output registers, each having control and data inputs and outputs, said data inputs being connected to receive said pair of sequential data words read out from said memory module units during a single bus cycle and said outputs being connected in common to said single word bus; and, control means connected to said control inputs of said pair of tri-state registers, to said address register and to said read/write control means, said control means being operative in response to signals from read/write control means indicative of said predetermined type of memory request to condition said pair of output registers to apply in succession each of said pair of data words to said bus for transfer to said processing unit over successive bus cycles of operation.

22. The memory subsystem of claim 21 wherein said subsystem further includes:

timing means for generating a predetermined sequence of timing signals in response to each memory request, said timing means being coupled to said pair of memory module units and to said pair of tri-state output register means, said pair of memory module units and said output register means being conditioned by certain ones of said sequence of timing signals to read out and store simultaneously said plurality of data words accessed from the storage locations designated by said sequential addresses of said rows of chips specified by said plurality of address select signals.

23. The memory subsystem of claim 22 wherein said read/write control means includes:

a number of bistable means coupled to said bus, a first one of said number of bistable means being connected to store a first signal indicating when said memory request specifies said predetermined type of read operation, said first bistable means being coupled to said control means, said control means including a plurality of gating means, each being connected to a different one of said pair of registers, said plurality of gating means in response to said first signal to generate a pair of control signals for conditioning corresponding ones of said pair of registers to transfer each of said data words in the order specified by the state of the least significant address bit.

24. The subsystem of claim 23 wherein each memory request coded to specify said predetermined read type operation causes the fetching of a pair of words from even and odd word locations within said even and odd module units.

25. The subsystem of claim 23 wherein said control means further includes bistable means having a plurality of inputs and an output, one of said inputs being coupled to said first bistable means and another input to said bus, and said output being connected to said first and second gating means, said bistable means when in a first state conditioning one of said plurality of gating means to switch to said first state so as to generate a first one of said pair of control signals for conditioning one of said tri-state registers to apply a first data word to said bus during a first one of said bus cycles and said bistable means being enabled by said first signal to switch from said first state to a second state in response to a first signal from said bus signalling the completion of said first bus cycle, another one of said plurality of gating means being conditioned by said bistable means when in said second state to switch to said first state so as to generate a second one of said pair of control signals for conditioning a second one of said pair of tri-state registers to apply a second data word to said bus during a second one of said bus cycles.

26. The subsystem of claim 25 wherein each of said plurality of gating means includes an exclusive OR gate.

27. The subsystem of claim 26 wherein said bistable means is operative when enabled by said first bistable means in response to a second signal signalling the completion of said second bus cycle from said bus to switch from said second state to said first state for returning said plurality of gating means to their initial states for processing the next memory request.

28. The subsystem of claim 22 wherein said subsystem further includes boundary circuit means coupled to receive predetermined address bits of said memory request and a signal from said bus indicative of said predetermined read type of memory operation, said boundary circuit including means coupled to said timing means for generating an output boundary condition signal in response to each predetermined read type of memory operation when said predetermined address bits have a predetermined value.

29. The subsystem of claim 28 wherein said timing means includes a first pair of gating means coupled to receive signals representative of the least significant address bit and its complement from said address register means, said first pair of gating means logically combining said output boundary condition signal with said least significant address bit and said complement for generating a pair of said other timing signals, said first pair of gating means being conditioned by said boundary condition signal to generate one of said certain ones of timing signals specified by the coding of said least significant address bit for read out of a first one of said plurality of data words from an odd storage location within a row of chips of said odd memory module unit.

30. The subsystem of claim 29 wherein said subsystem further includes bus control means coupled to said read/write control means, to said bus and to said timing means and to said boundary circuit means, said bus control means including:

bistable means having a plurality of input terminals and output terminals;

a plurality of input gating means coupled to said input terminals, a first one of said gating means being coupled to said timing means and a second one of said gating means being coupled to said boundary circuit means; and, output circuit means coupled to said output terminal; and, said read/write control means including:

a plurality of bistable means, a first one of said plurality of bistable means being coupled to said first one of said gating means and to said bus for storing a first signal indicating when said memory request specifies said predetermined type of read operation, a second one of said bistable means being coupled to said bus for storing a second signal indicating whether said memory request specifies a read or write type memory operation; and logic circuit means coupled to said first and second bistable means and to said second one of said gating means, said logic circuit means logically combining said first and second signals to generate an output signal designating said predetermined read type of operation, said bistable means being conditioned by said output signal to switch to a first state for conditioning a first one of said output circuit means to generate a response signal on said bus concurrent with the transfer of each data word indicating continued transfer of data words and said second gating means being operative in response to said boundary condition signal generated in response to said request specifying said predetermined type of read operation to switch said bistable means from said first state to a second state inhibiting said first one of said output circuit means from generating said response signal, indicating that only a first word of said pair of data words is being transferred in response to said request.

* * * * *